US012157990B2

(12) United States Patent
Tagami

(10) Patent No.: US 12,157,990 B2
(45) Date of Patent: Dec. 3, 2024

(54) SHOVEL AND INFORMATION PROCESSING DEVICE

(71) Applicant: SUMITOMO CONSTRUCTION MACHINERY CO., LTD., Tokyo (JP)

(72) Inventor: Daisuke Tagami, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 390 days.

(21) Appl. No.: 17/448,401

(22) Filed: Sep. 22, 2021

(65) Prior Publication Data

US 2022/0002974 A1 Jan. 6, 2022

Related U.S. Application Data

(63) Continuation of application No. PCT/JP2020/008943, filed on Mar. 3, 2020.

(30) Foreign Application Priority Data

Mar. 30, 2019 (JP) ................................ 2019-069473

(51) Int. Cl.
*E02F 9/26* (2006.01)
*E02F 9/20* (2006.01)
(Continued)

(52) U.S. Cl.
CPC .......... *E02F 9/2235* (2013.01); *E02F 9/2004* (2013.01); *E02F 9/26* (2013.01);
(Continued)

(58) Field of Classification Search
CPC ......... E02F 9/2235; E02F 9/2004; E02F 9/26; E02F 9/205; E02F 9/2285; E02F 9/2292;
(Continued)

(56) References Cited

U.S. PATENT DOCUMENTS 9,181,681 B2 * 11/2015 Okazaki ............... E02F 9/2228
10,400,797 B2 * 9/2019 Udagawa ............... F15B 11/02
(Continued)

FOREIGN PATENT DOCUMENTS

CN 107660247 2/2018
JP H09-025652 1/1997
(Continued)

OTHER PUBLICATIONS

Machine Translation JP 2015081458 (Year: 2015).*
(Continued)

*Primary Examiner* — Anne Marie Antonucci
*Assistant Examiner* — Lidia Kwiatkowska
(74) *Attorney, Agent, or Firm* — IPUSA, PLLC

(57) ABSTRACT

A shovel includes an undercarriage, an upper slewing structure which is rotatably mounted on the undercarriage, a boom attached to the upper slewing structure, an arm attached to a tip end of the boom, an auxiliary attachment attached to a tip end of the arm, a main pump configured to supply a hydraulic oil to the auxiliary attachment and other hydraulic actuators, and a controller. The controller performs a setting related to a flow rate of the main pump at a time of a combined operation in which the auxiliary attachment and the other hydraulic actuators are operated simultaneously.

13 Claims, 12 Drawing Sheets

(51) Int. Cl.
*E02F 9/22* (2006.01)
*F15B 11/02* (2006.01)

(52) U.S. Cl.
CPC ............... *F15B 11/02* (2013.01); *E02F 9/205* (2013.01); *E02F 9/2285* (2013.01); *E02F 9/2292* (2013.01); *E02F 9/2296* (2013.01)

(58) Field of Classification Search
CPC ..... E02F 9/2296; E02F 9/2282; E02F 9/2221; E02F 9/123; F15B 11/02; F15B 11/0423; F15B 2211/20523; F15B 2211/20546; F15B 2211/20576; F15B 2211/2656; F15B 2211/3116; F15B 2211/327; F15B 2211/6306; F15B 2211/6309; F15B 2211/6333; F15B 2211/6346; F15B 2211/6652; F15B 2211/6656; F15B 2211/6658; F15B 2211/7142; F15B 2211/85; F15B 2211/857; F15B 11/16; F04B 23/04; F04B 49/065; F04B 2205/09; F04B 2207/041
See application file for complete search history.

(56) References Cited

U.S. PATENT DOCUMENTS

| | | | | |
|---|---|---|---|---|
| 2002/0083825 | A1 | 7/2002 | Kusuyama | |
| 2009/0243831 | A1 | 10/2009 | Miura et al. | |
| 2013/0218425 | A1 | 8/2013 | Okazaki et al. | |
| 2016/0091002 | A1 | 3/2016 | Miura et al. | |
| 2017/0227028 | A1 | 8/2017 | Ueda | |
| 2018/0347598 | A1 | 12/2018 | Kondo et al. | |
| 2019/0048560 | A1* | 2/2019 | Misaki | E02F 9/261 |
| 2020/0024825 | A1* | 1/2020 | Futakami | E02F 3/96 |

FOREIGN PATENT DOCUMENTS

| | | | | |
|---|---|---|---|---|
| JP | 2002-201675 | | | 7/2002 |
| JP | 2002-339908 | | | 11/2002 |
| JP | 2004-116103 | | | 4/2004 |
| JP | 2005-226678 | | | 8/2005 |
| JP | 2007-100779 | | | 4/2007 |
| JP | 2007-162866 | | | 6/2007 |
| JP | 2009-235720 | | | 10/2009 |
| JP | 2011-231489 | | | 11/2011 |
| JP | 2012-092587 | | | 5/2012 |
| JP | 2015-081458 | | | 4/2015 |
| JP | 2015081458 | A | * | 4/2015 |
| JP | 2016-070004 | | | 5/2016 |
| JP | 2016-173031 | | | 9/2016 |
| JP | 2017-137968 | | | 8/2017 |
| JP | 2019-44933 | | | 3/2019 |
| KR | 20180105368 | A | * | 9/2018 |

OTHER PUBLICATIONS

Machine Translation JP-2015081458-A (Year: 2015).*
International Search Report for PCT/JP2020/008943 mailed on Apr. 21, 2020.

* cited by examiner

SHOVEL AND INFORMATION PROCESSING DEVICE

CROSS REFERENCE TO RELATED APPLICATIONS

This application is a continuation application of International Application No. PCT/JP2020/008943 filed on Mar. 3, 2020 and designated the U.S., which is based upon and claims priority to Japanese Patent Application No. 2019-069473, filed on Mar. 30, 2019, the entire contents of each of which are hereby incorporated by reference.

BACKGROUND

1. Technical Field

The present disclosure relates to shovels, information processing devices, or the like.

2. Description of the Related Art

There is a known technique for appropriately adjusting a flow rate of a hydraulic pump when operating an auxiliary attachment, such as a breaker or the like.

However, the known technique does not mention performing a combined operation in which an auxiliary attachment and a driven element, such as a boom, arm, or the like, are simultaneously operated. For this reason, when the flow rate of the hydraulic pump is increased to cope with the combined operation, for example, the flow rate of a hydraulic oil supplied to an end attachment may become excessively high, and inconveniences, such as breakdown or the like, may occur.

SUMMARY

It is desirable to provide a technique capable of appropriately adjusting the flow rate of the hydraulic pump at the time of performing the combined operation in which the auxiliary attachment and another driven element are operated simultaneously.

According to one aspect of the embodiments, a shovel includes an undercarriage; an upper slewing structure which is rotatably mounted on the undercarriage; a boom attached to the upper slewing structure; an arm attached to a tip end of the boom; an auxiliary attachment attached to a tip end of the arm; a hydraulic pump configured to supply a hydraulic oil to the auxiliary attachment and other hydraulic actuators; an input device configured to receive an input from a user; and a controller, wherein the controller performs a setting related to a flow rate of the hydraulic pump at a time of a combined operation in which the auxiliary attachment and the other hydraulic actuators are operated simultaneously, according to a predetermined input received by the input device.

According to another aspect of the embodiments, an information processing device includes a communication unit configured to communicate with a shovel including a undercarriage, an upper slewing structure which is rotatably mounted on the undercarriage, a boom attached to the upper slewing structure, an arm attached to a tip end of the boom, an auxiliary attachment attached to a tip end of the arm, a hydraulic pump configured to supply a hydraulic oil to the auxiliary attachment and other hydraulic actuators; an input device configured to receive an input from a user; and a setting unit configured to perform a setting related to a flow rate of the hydraulic pump at a time of a combined operation in which the auxiliary attachment and the other hydraulic actuators are operated simultaneously, according to a predetermined input received by the input device, wherein the communication unit transmits contents set by the setting unit to the shovel.

Other objects and further features of the present invention will be apparent from the following detailed description when read in conjunction with the accompanying drawings.

DETAILED DESCRIPTION

Figure 1A:
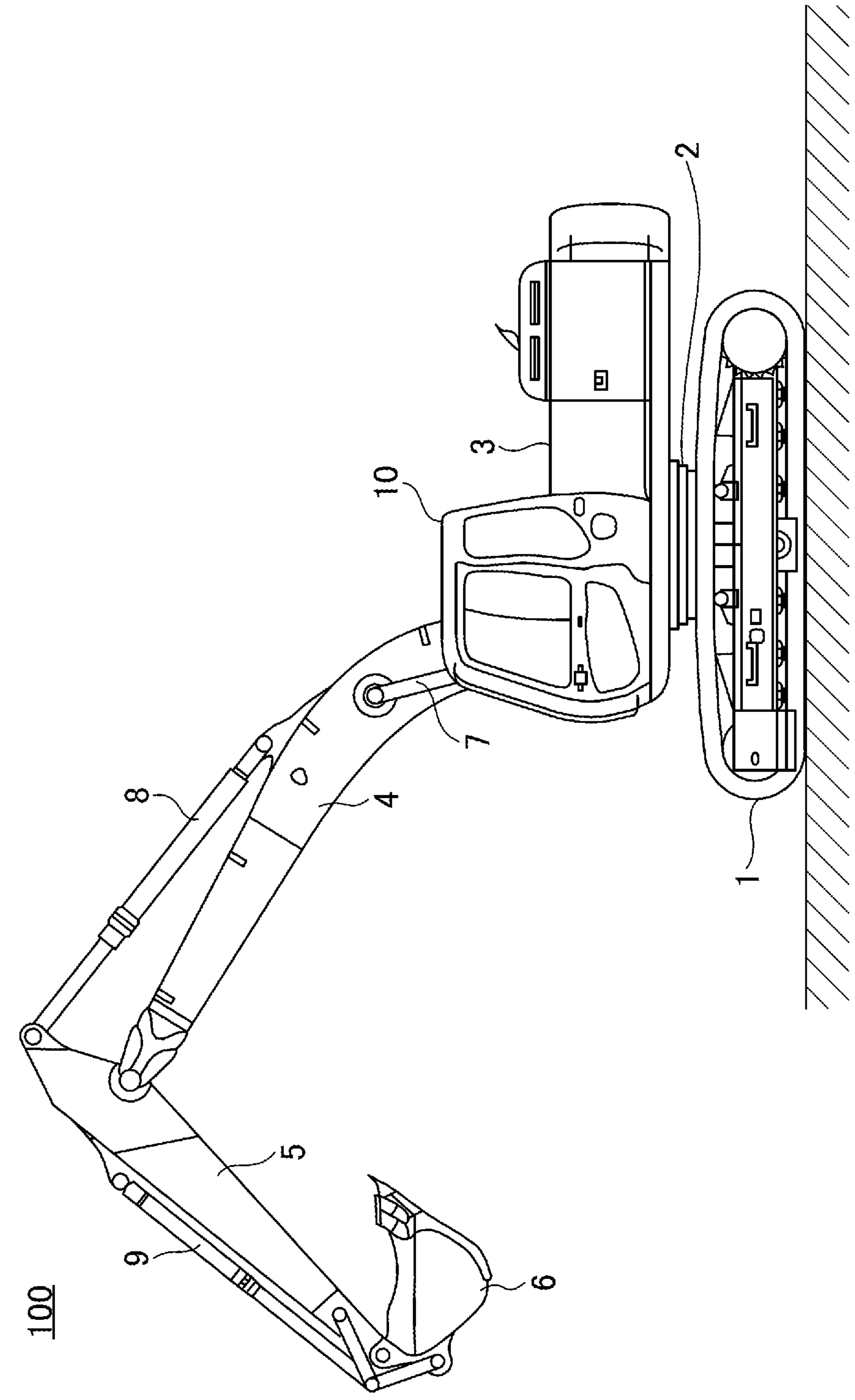
FIG. 1A is a diagram illustrating an example of a shovel according to one embodiment.

Hereinafter, embodiments of the present invention will be described, by referring to the drawings.

[Overview of Shovel]

Figure 1B:
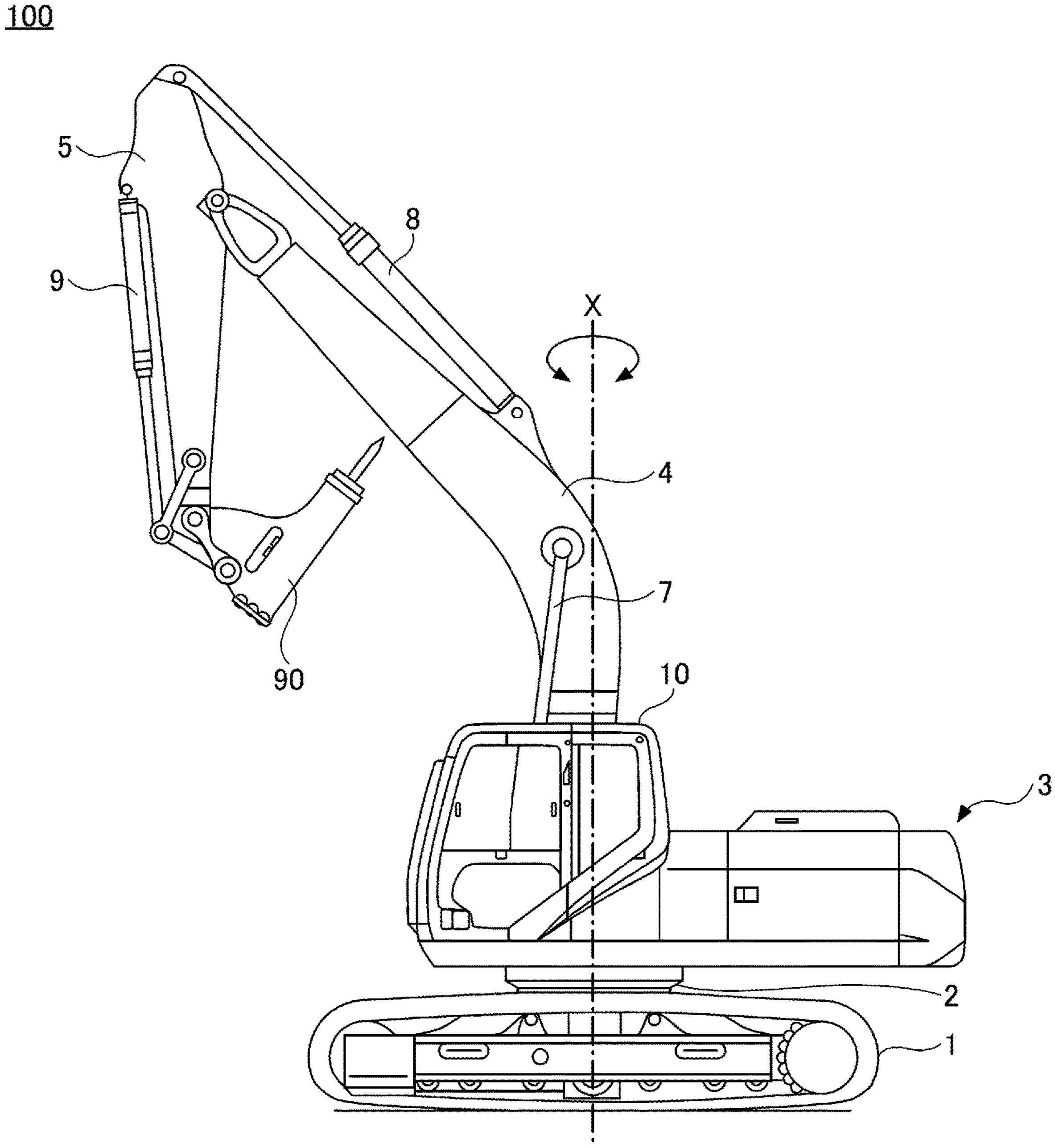
FIG. 1B is a diagram illustrating another example of the shovel according to one embodiment.
Figure 1C:
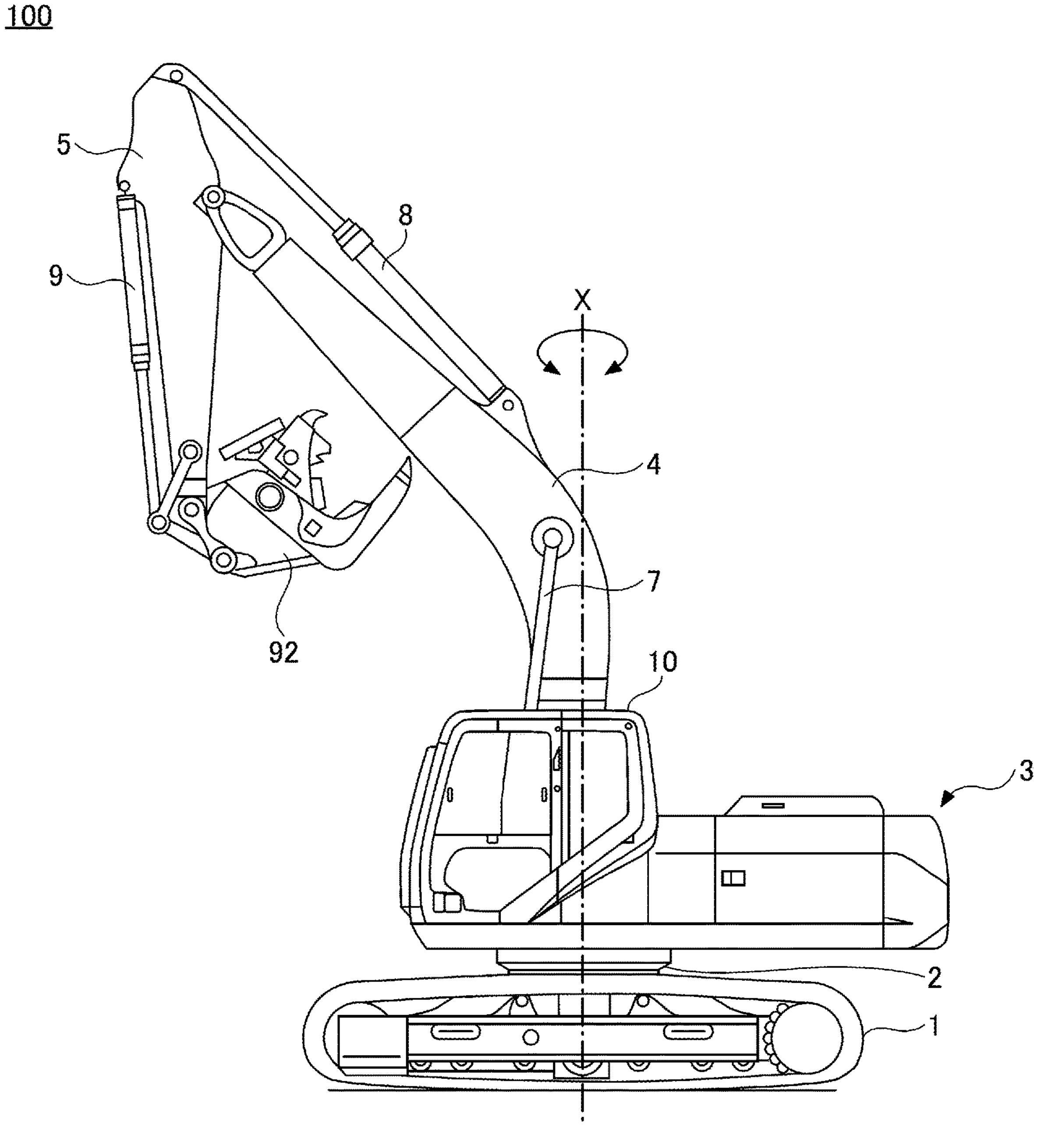
FIG. 1C is a diagram illustrating still another example of the shovel according to one embodiment.

First, an overview of a shovel 100 according to this embodiment will be described, with reference to FIG. 1 (FIG. 1A through FIG. 1C).

FIG. 1A through FIG. 1C illustrate an example, another example, and still another example of the shovel 100 according to this embodiment.

The shovel 100 according to this embodiment includes an undercarriage 1, an slewing upper structure 3 that is rotatably mounted on the undercarriage 1 via a slewing mechanism 2, attachments (working devices) including a boom 4, an arm 5, and an end attachment, and a cabin 10.

The undercarriage 1 includes a pair of crawlers formed by left and right crawlers, and the respective crawlers are hydraulically driven by crawler hydraulic motors 1L and 1R (refer to FIG. 2), to cause the shovel 100 to crawl (be mobile).

The slewing upper structure 3 swings with respect to the undercarriage 1, by being driven by a swing hydraulic motor 2A (refer to FIG. 2).

The boom 4 is pivotally fit (mounted) at a front center of the slewing upper structure 3 and is able to pitch, the arm 5 is pivotally fit (mounted) at a tip end of the boom 4 and is able to swing up and down, and the end attachment is pivotally fit (mounted) at a tip end of the arm 5 and are able to swing up and down. Attitudes (rotating shafts) of the boom 4, the arm 5, and the end attachment are respectively hydraulically driven by a boom cylinder 7, an arm cylinder 8, and a bucket cylinder 9 that are provided as hydraulic actuators.

The end attachment is attached to the arm 5 in a replaceable manner, as appropriate, according to work details of the shovel 100.

For example, as illustrated in FIG. 1A, the tip end of the arm 5 is fitted with a bucket 6, as the end attachment. As illustrated in FIG. 1B and FIG. 1C, the tip end of the arm 5 may be fitted with an auxiliary attachment, as the end attachment in place of the bucket 6. For example, as illustrated in FIG. 1B, a breaker 90 (an example of the auxiliary attachment) may be attached to the tip end of the arm 5. In addition, as illustrated in FIG. 1C, a crusher 92 (an example of the auxiliary attachment) may be attached to the tip end of the arm 5. Further, an auxiliary attachment (for example, a tilt rotator) may be attached to the tip end of the arm 5 in a state interposed between the arm 5 and the end attachment.

The auxiliary attachment includes a hydraulic actuator which drives the auxiliary attachment itself. For this reason, in the following description, the auxiliary attachment is treated as a hydraulic actuator when comparing to other hydraulic actuators (for example, the boom cylinder 7 or the like), and treated as a driven element when comparing to other driven elements (for example, the boom 4 or the like).

The cabin 10 is a craneman's house that is boarded by an operator or the like, and is mounted at a front left of the slewing upper structure 3.

The shovel 100 operates the driven elements, such as the undercarriage 1 (left and right crawlers), the slewing upper structure 3, the boom 4, the arm 5, the bucket 6, or the like, according to operations made by an operator who boards the cabin 10.

In place of or in addition to the configuration which enables the operator who boards the cabin 10 to operate the shovel 100, a configuration may be employed to remotely operate (remotely control) the shovel 100 from outside the shovel 100. When remotely controlling the shovel 100, the cabin 10 may be unmanned. In the following description, it is assumed that the operation made by the operator includes at least one of an operation made by an operator in the cabin 10 with respect to an operating device 26, and a remote control made by an external operator.

The remote control includes an operation in which the shovel 100 is operated according to an operation input, which is related to the actuator of the shovel 100 and is made from a predetermined external device, for example. The predetermined external device may be a support device 200 described later, for example. In this case, the shovel 100 transmits image information (captured image) output from an imaging device which captures a periphery of the slewing upper structure 3, for example, to the external device, and the image information may be displayed on a display device (hereinafter referred to as a "remote control display device") provided on the external device. In addition, various information images (information screens) displayed on a display device 50, which is provided in the cabin 10 of the shovel 100 and will be described later, may similarly be displayed on the remote control display device of the external device. Accordingly, the operator of the external device may remotely control the shovel 100 while checking display contents of the captured image, the information screens, or the like indicating the state of the periphery of the shovel 100 displayed on the remote control display device. Moreover, the shovel 100 may operate the actuator according to a remote control signal received from the external device and indicating the contents of the remote control, and drive the driven element such as the undercarriage 1 (left and right crawlers), the slewing upper structure 3, the boom 4, the arm 5, the bucket 6, or the like.

Further, the remote control may also include an operation in which the shovel 100 is operated by an external speech input, a gesture input, or the like with respect to shovel 100 from a person (for example, a worker) in the periphery of the shovel 100, for example. More particularly, the shovel 100 may recognize a speech made by the worker or the like in the periphery via a speech input device (for example, a microphone) attached to the shovel 100, a gesture made by the worker or the like in the periphery via a gesture input device (for example, an imaging device) attached to the shovel 100, or the like. The shovel 100 may operate the actuator according to the contents of the recognized speech, gesture, or the like, to drive the driven element such as the undercarriage 1 (left and right crawlers), the slewing upper structure 3, the boom 4, the arm 5, the bucket 6, or the like.

The shovel 100 may also automatically operate the actuator regardless of the contents of the operation made by the operator. Hence, the shovel 100 can provide a function (so-called "automatic operation function" or "machine control function") to automatically operate at least some of the driven elements such as the undercarriage 1 (left and right crawlers), the slewing upper structure 3, the boom 4, the arm 5, the bucket 6, or the like.

The automatic operation function may include a function (so-called "semi-automatic operation function") to automatically operate a driven element (hydraulic actuator) other than the driven element (hydraulic actuator) which is a target to be operated, according to the operation made by the operator with respect to the operating device 26 or the remote control. In addition, the automatic operation function may also include a function (so-called "fully automatic operation function") to automatically operate at least some of the plurality of driven elements (hydraulic actuators), under a precondition that the operation by the operator with respect to the operating device and the remote operation are not performed. When the fully automatic operation function is enabled in the shovel 100, the cabin 10 may be unmanned. In addition, the semi-automatic operation function, the fully automatic operation function, or the like may include an operation function in which the operation contents of the driven element (hydraulic actuator) which is the target of the automatic operation are automatically prescribed according to a predetermined rule. Further, the semi-automatic operation function, the fully automatic operation function, or the like may include an operation function (so-called "autonomous operation function") in which the shovel 100 autonomously makes various determinations, and determines the operation contents of the driven element (hydraulic actuator) which is the target of the autonomous automatic operation according to the results of the various determinations.

[Configuration of Shovel]

Next, a configuration of the shovel 100 will be described, with reference to FIG. 2 (FIG. 2A and FIG. 2B), in addition to FIG. 1A through FIG. 1C.

Figure 2A:
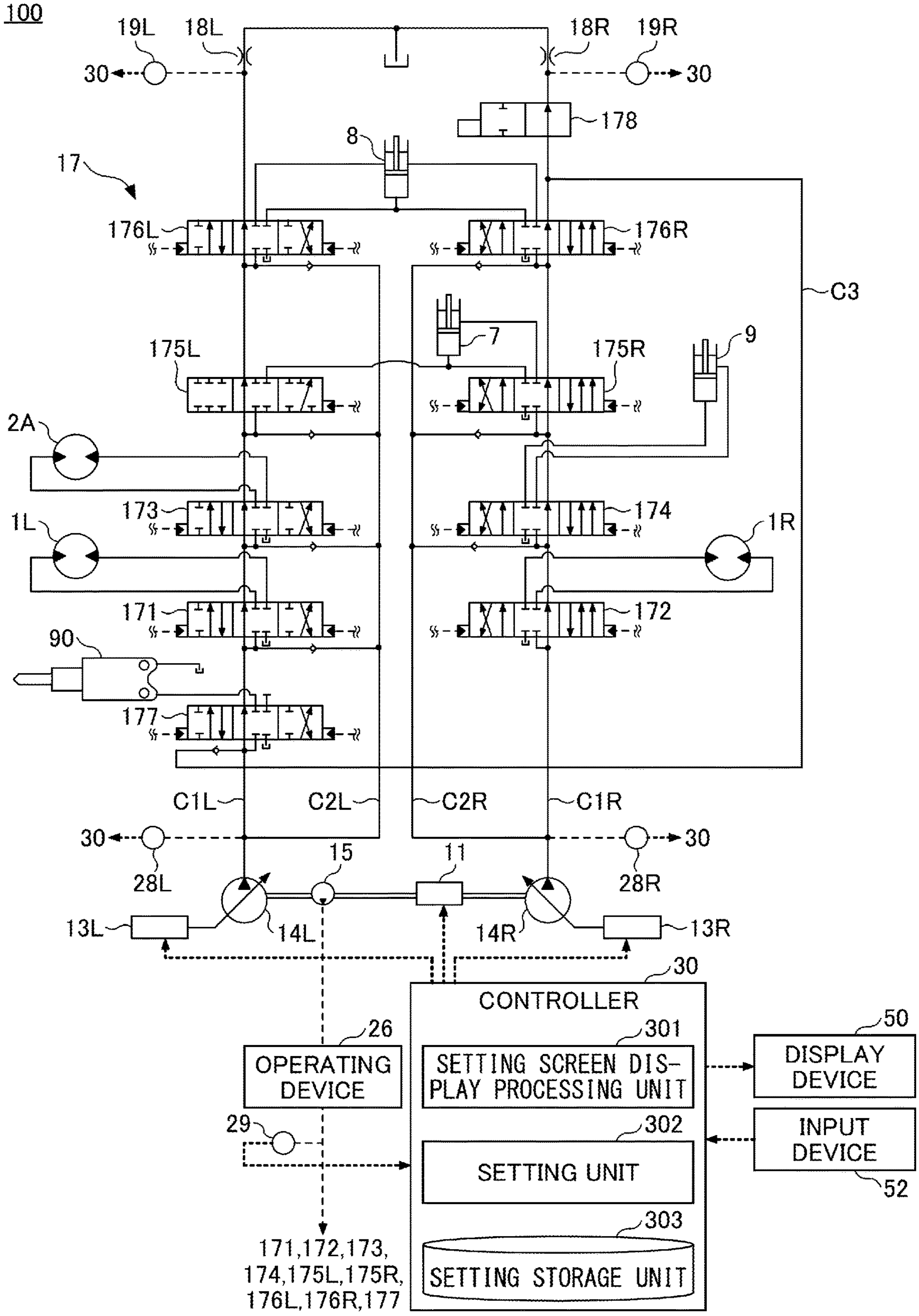
FIG. 2A is a diagram illustrating an example of a configuration of the shovel according to one embodiment.
Figure 2B:
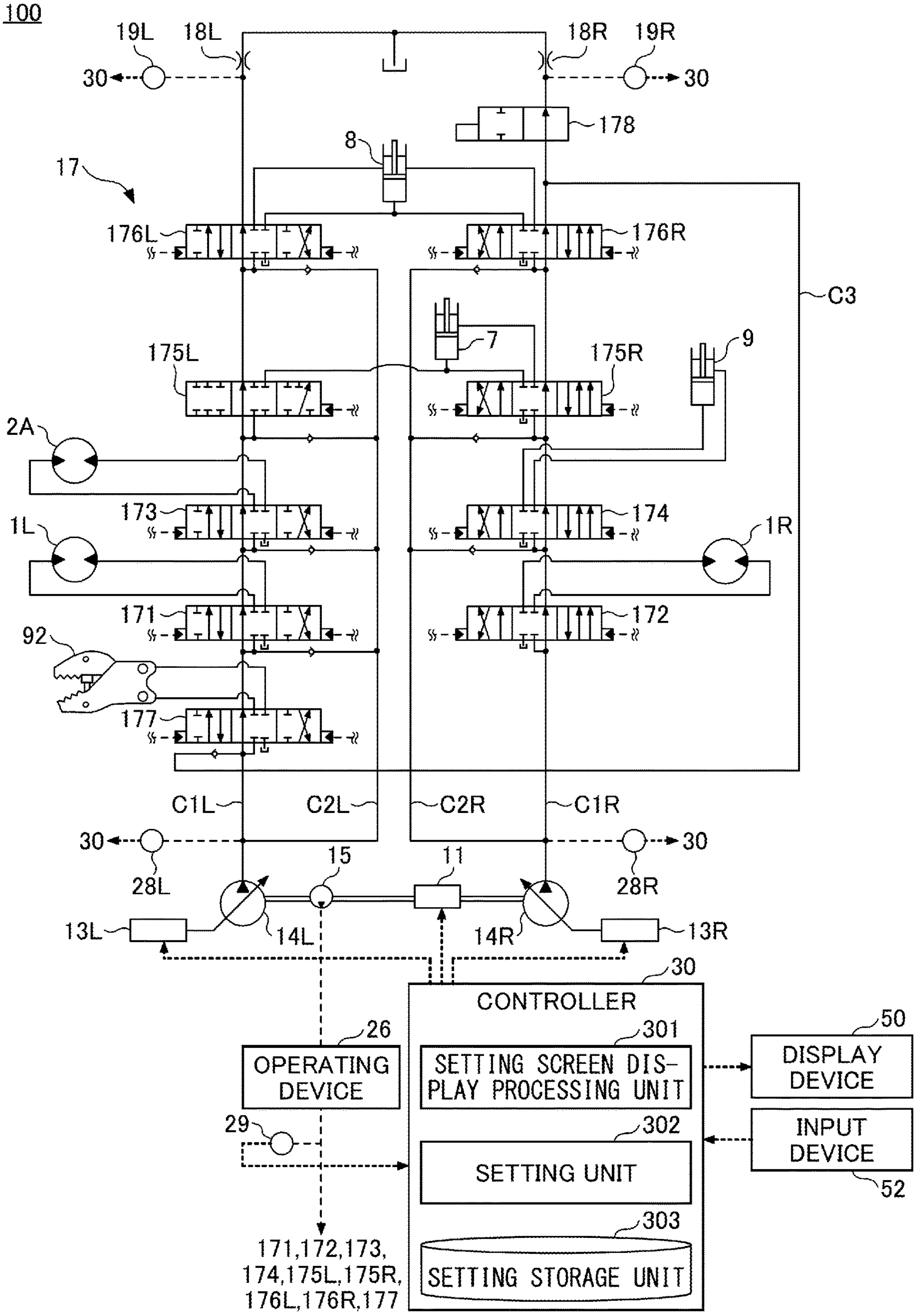
FIG. 2B is a diagram illustrating another example of the configuration of the shovel according to one embodiment.

FIG. 2A and FIG. 2B are diagrams illustrating one example and another example of the configuration of the shovel 100 according to this embodiment, respectively. More particularly, FIG. 2A is a diagram illustrating the configuration of the shovel 100 having the breaker 90 attached thereto, and FIG. 2B is a diagram illustrating the configuration of the shovel 100 having the crusher 92 attached thereto.

In FIG. 2, a mechanical power line is represented by a double line, a high-pressure hydraulic line is represented by a solid line, a pilot line is represented by a dashed line, and an electric drive and control line is represented by a dotted line. Further, the illustration of a configuration of the shovel 100 in a state where the bucket 6 is attached thereto will be omitted, because the breaker 90 and the crusher 92 illustrated in FIG. 2A and FIG. 2B are simply omitted, and an output oil passage of a control valve 177 is simply closed.

<Hydraulic Drive System of Shovel>

The hydraulic driving system of the shovel 100 according to this embodiment includes the hydraulic actuators which hydraulically drive the driven elements, such as the undercarriage 1, the slewing upper structure 3, the boom 4, the arm 5, the attitudes (rotating shafts) of the end attachments, the auxiliary attachments (the breaker 90, the crusher 92), or the like, respectively. The hydraulic actuators include the crawler hydraulic motors 1L and 1R, the swing hydraulic motor 2A, the boom cylinder 7, the arm cylinder 8, the bucket cylinder 9, and hydraulic mechanisms provided in the auxiliary attachments. In addition, the hydraulic driving system of the shovel 100 according to this embodiment includes an engine 11, main pumps 14L and 14R, and the control valve 17.

The engine 11 is the main power source of the hydraulic driving system, and is attached to the rear of the slewing upper structure 3, for example. More particularly, the engine 11 rotates at a target rotational speed that is preset, under a control of a controller 30, and drives the main pumps 14L and 14R and a pilot pump 15. The engine 11 is a diesel engine which uses a light oil as the fuel.

The main pumps 14L and 14R are attached to the rear of the slewing upper structure 3, for example, similar to the engine 11, and supply a hydraulic oil to the control valve 17 via the high-pressure hydraulic lines. The main pumps 14L and 14R are respectively driven by the engine 11, as described above. The main pumps 14L and 14R are variable capacity hydraulic pumps, for example, and are capable of controlling a discharge flow rate (discharge pressure), by adjusting a stroke length of a piston by controlling an angle (inclination angle) of a swash plate by regulators 13L and 13R under the control of the controller 30.

The control valve 17 is attached to a center portion of the slewing upper structure 3, for example, and is a hydraulic control device which controls the hydraulic driving system according to the operation performed by the operator or the like with respect to the operating device 26. The control valve 17 connects to the main pumps 14L and 14R via the high-pressure hydraulic lines, and selectively supplies the hydraulic oil supplied from the main pumps 14L and 14R to each of the hydraulic actuators according to the operation from the operating device 26 and the state of the remove control. More particularly, the control valve 17 includes control valves 171, 172, 173, 174, 175L, 175R, 176L, 176R, and 177 which control the flow rate and the direction of flow of the hydraulic oil supplied from the main pumps 14L and 14R to each of the hydraulic actuators. In addition, the control valve 17 includes a neutral and check valve 178 of a center bypass oil passage C1R.

The hydraulic driving system of the shovel 100 circulates the hydraulic oil from each of the main pumps 14L and 14R driven by the engine 11 to a hydraulic oil tank through center bypass oil passages C1L and C1R, and parallel oil passages C2L and C2R.

The center bypass oil passage C1L starts from the main pump 14L, and reaches the hydraulic oil tank by successively passing through the control valves 177, 171, 173, 175L, and 176L arranged in the control valve 17.

The center bypass oil passage C1R starts from the main pump 14R, and reaches the hydraulic tank by successively passing through the control valves 172, 174, 175R, and 176R, and the neutral and check valve 178 which are arranged in the control valve 17. Further, in this embodiment, the control valves 172, 174, 175R, and 176R always maintain the center bypass passage C1R to a communicating state. For this reason, the center bypass passage C1R is in the communicating state as long as the neutral and check valve 178 is in an open state.

The control valve 171 is a spool valve which supplies the hydraulic oil discharged from the main pump 14L to the crawler hydraulic motor 1L, and discharges the hydraulic oil discharged from the crawler hydraulic motor 1L to the hydraulic oil tank.

The control valve 172 is a spool valve which supplies the hydraulic oil discharged from the main pump 14R to the crawler hydraulic motor 1R, and discharges the hydraulic oil discharged from the crawler hydraulic motor 1R to the hydraulic oil tank.

The control valve 173 is a spool valve which supplies the hydraulic oil discharged from the main pump 14L to the swing hydraulic motor 2A, and discharges the hydraulic oil discharged from the swing hydraulic motor 2A to the hydraulic oil tank.

The control valve 174 is a spool valve which supplies the hydraulic oil discharged from the main pump 14R to the bucket cylinder 9, and discharges the hydraulic oil in the bucket cylinder 9 to the hydraulic oil tank.

The control valves 175L and 175R are spool valves which supply the hydraulic oil discharged from the main pumps 14L and 14R to the boom cylinder 7, respectively, and discharge the hydraulic oil in the boom cylinder 7 to the hydraulic oil tank.

The control valves 176L and 176R supply the hydraulic oil discharged from the main pumps 14L and 14R to the arm cylinder 8, respectively, and discharge the hydraulic oil in the arm cylinder 8 to the hydraulic oil tank.

The control valve 177 is a spool valve which supplies the hydraulic oil discharged by the main pump 14L to the auxiliary attachment.

As illustrated in FIG. 2A, for example, the breaker 90 may be a single acting type, such that the hydraulic oil only flows in one direction. For this reason, the control valve 177 uses a center spool position to stop supplying the hydraulic oil to the breaker 90, and a left spool position to supply the hydraulic oil to the breaker 90.

In addition, as illustrated, FIG. 2B, for example, the crusher may be a double acting type, such that the hydraulic oil flows in two directions. For this reason, the control valve 177 supplies the hydraulic oil discharged from the main pump 14L to the auxiliary attachment, and discharges the hydraulic oil inside the auxiliary attachment to the hydraulic oil tank. In other words, the control valve 177 uses the center spool position to stop the supply of the hydraulic oil to the crusher 92, the left spool position to supply the hydraulic oil in a first direction to the crusher 92, and a right spool position to supply the hydraulic oil in a second direction, which is opposite the first direction, to the crusher 92.

The control valves 171, 172, 173, 174, 175L, 175R, 176L, and 176R adjust the flow rate of the hydraulic oil and switch the direction of flow of the hydraulic oil supplied to and discharged from the hydraulic actuators, respectively, according to pilot pressures acting on pilot ports.

The neutral and check valve 178 is provided at a position which is downstream of the control valve 176R of the center bypass oil passage C1R, and upstream of a negative control restrictor (hereinafter referred to as "negative control restrictor") 18R which will be described later. The neutral and check valve 178 is normally a valve (normal open valve) which is normally open, and is closed according to a control command from the controller 30. The neutral and check valve 178 may be closed under the control of the controller 30, to shut off the center bypass oil passage C1R on the downstream side of the control valve 176R.

The parallel oil passage C2L supplies the hydraulic oil from the main pump 14L to the control valves 171, 173, 175L, and 176L, in parallel with the center bypass oil passage C1L. More particularly, the parallel oil passage C2L branches from the center bypass oil passage C1L at a position on the upstream side of the control valve 171, and is configured to supply the hydraulic oil from the main pump 14L to each of the control valves 171, 173, 175L, and 176R in parallel. Hence, when the flow of hydraulic oil through the center bypass oil passage C1L is restricted or shut off by one of the control valves 171, 173, and 175L, the parallel oil passage C2L can supply the hydraulic oil to the control valve located more on the downstream side.

The parallel oil passage C2R supplies the hydraulic oil from the main pump 14R to the control valves 172, 174, 175R, and 176R, in parallel with the center bypass oil passage C1R. More particularly, the parallel oil passage C2R branches from the center bypass oil passage C1R at a position on the upstream side of the control valve 172, and is configured to supply the hydraulic oil from the main pump 14R to each of the control valves 172, 174, 175R, and 176R in parallel. Hence, when the flow of hydraulic oil through the center bypass oil passage C1R is restricted or shut off by one of the control valves 172, 174, and 175R, the parallel oil passage C2R can supply the hydraulic oil to the control valve located more on the downstream side.

A bypass oil passage C3 connects an oil passage portion between the neutral and check valve 178 and the control valve 176R of the center bypass oil passage C1R, and an oil passage portion on the upstream side of the control valve 177 of the center bypass oil passage C1L. A check valve is also provided in the bypass oil passage C3, and the bypass oil passage Cl allows only the flow of the hydraulic oil from the center bypass oil passage C1R to the center bypass oil passage C1L. Hence, when the neutral and check valve 178 is closed, the bypass oil passage C3 causes the hydraulic oil of the center bypass oil passage C1R, that is, the hydraulic oil from the main pump 14R, to merge to the center bypass oil passage C1L on the upstream side of the control valve 177. For this reason, the auxiliary attachment can receive the supply of the hydraulic oil from both the main pumps 14L and 14R through the control valve 177, under the control of the controller 30.

<Operation System of Shovel>

An operation system of the shovel 100 according to this embodiment includes a pilot pump 15, and the operating device 26.

The pilot pump 15 is attached to the rear of the slewing upper structure 3, for example, similar to the engine 11, and supplies a pilot pressure to the operating device 26 via a pilot line 25. The pilot pump 15 may be a fixed capacitive hydraulic pump, for example, and is driven by the engine 11 as described above.

The operating device 26 is provided near an operator's seat in the cabin 10, and functions as an operation input means to be manipulated by the operator or the like to operate the driven elements (the undercarriage 1, the slewing upper structure 3, the boom 4, the arm 5, the bucket 6, the attitudes (rotating shafts) of the end attachments, the auxiliary attachments, or the like). In other words, the operating device 26 is the operation input means for operating the hydraulic actuators (that is, the crawler hydraulic motors 1L and 1R, the swing hydraulic motor 2A, the boom cylinder 7, the arm cylinder 8, the bucket cylinder 9, the hydraulic mechanisms of the auxiliary attachments, or the like) which drive the driven elements, respectively. The operating device 26 includes four lever devices which operate the attitudes (rotating shafts) of each of the slewing upper structure 3 (the swing hydraulic motor 2A), the boom 4 (the boom cylinder 7), the arm 5 (the arm cylinder 8), the end attachment (the bucket cylinder 9), for example. In addition, the operating device 26 includes two lever devices or pedal devices which operate (the rotating shafts) of each of the left crawler and the right crawler of the undercarriage 1 (the crawler hydraulic motors 1L and 1R), for example. In addition, the operating device 26 includes a lever device or a pedal device which operates the auxiliary attachment, for example.

As illustrated in FIG. 2A and FIG. 2B, the operating device 26 may be a hydraulic pilot type configured to output the hydraulic oil having the pilot pressure corresponding to the operation contents thereof, for example. The operating device 26 is connected to the control valve 17 via the pilot line. Hence, the control valve 17 receives the pilot pressures in accordance with the operating states of the driven elements (that is, the hydraulic actuators driving the driven elements) on the operating device 26. More particularly, secondary pilot pressures of the two lever devices or pedal devices operating the left crawler (crawler hydraulic motor 1L) and the right crawler (crawler hydraulic motor 1R) act on the pilot ports of the control valves 171 and 172, respectively. In addition, a secondary pilot pressure of the lever device operating the slewing upper structure 3 (swing hydraulic motor 2A) acts on the pilot port of the control valve 173. Moreover, a secondary pilot pressure of the lever device operating the boom 4 (boom cylinder 7) acts on the pilot ports of the control valves 175L and 175R. Furthermore, a secondary pilot pressure of the lever device operating the arm 5 (arm cylinder 8) acts on the pilot ports of the control valves 176L and 176R. In addition, a secondary pilot pressure of the lever device operating the attitude (bucket cylinder 9) of the end attachment acts on the pilot port of the control valve 174. In addition, a secondary pilot pressure of the lever device, the pedal device, or the like operating the auxiliary attachment acts on the pilot port of the control valve 177. Hence, the control valve 17 can drive the respective hydraulic actuators according to the operating state of the operating device 26.

The operating device 26 may be an electric type which outputs electrical signals (hereinafter, referred to as "operation signals") corresponding to the operation contents thereof, for example. In this case, the operation signals from the operating device 26 are input to the controller 30, and the controller 30 controls each of the control valves of the control valve 17 according to the input operation signals, to perform the operation of the various hydraulic actuators according to the operation contents with respect to the operating device 26. For example, the control valves of the control valve 17 may be electromagnetic solenoid spool valves driven by the commands from the controller 30. In addition, a hydraulic control valve (hereinafter referred to as an "operating control valve"), which operates according to the control command from the controller 30, may be arranged between the pilot pump 15 and the pilot port of each control valve, for example. In this case, when a manual operation is performed using the electric type operating device 26, the controller 30 can control the operating control valve by the control command corresponding to an operating amount (for example, a lever operating amount) and increase or decrease the pilot pressure, so as to operate each of the control valves according to the operation contents with respect to the operating device 26.

<Control System of Shovel>

A control system of the shovel 100 according to this embodiment includes the controller 30, the regulators 13L and 13R, the negative control restrictors 18L and 18R, negative control pressure sensors 19L and 19R, a discharge pressure sensor 28, an operation pressure sensor 29, the display device 50, and an input device 52.

The controller 30 performs various control related to the shovel 100. Functions of the controller 30 may be implemented by arbitrary hardware, a combination of hardware and software, or the like. For example, the controller 30 may be formed mainly of a computer including a processor such as a Central Processing Unit (CPU) or the like, a memory device such as a Random Access Memory (RAM) or the like, a non-volatile auxiliary storage device such as a Read Only Memory (ROM), various input and output interfaces, or the like. The controller 30 may perform the various functions by executing various programs installed in the auxiliary storage device by the CPU, for example.

For example, the controller 30 sets the target rotational speed based on an operation mode that is preset by the operator or the like, and drives and controls the engine 11 to undergo a constant rotation, either directly or through a dedicated control device of the engine 11.

For example, the controller 30 controls the regulators 13L and 13R, and adjusts the inclination angle of the swash plate of the main pumps 14L and 14R, to control the discharge rates (flow rate) of the main pumps 14L and 14R.

More particularly, the controller 30 may control the regulators 13L and 13R to adjust the discharge rates of the main pumps 14L and 14R, so as to become less than or equal to preset maximum flow rates of the main pumps 14L and 14R.

In addition, the controller 30 may control the regulators 13L and 13R according to discharge pressures of the main pumps 14L and 14R detected by discharge pressure sensors 28L and 28R, to control the discharge rates of the main pumps 14L and 14R. For example, the controller 30 may adjust the inclination angle of the swash plate of the main pump 14L according to an increase in the discharge pressure of the main pump 14L, through the regulator 13L, to reduce the discharge rate. The same applies to the regulator 13R. Accordingly, the controller 30 can control a gross horsepower of the main pumps 14L and 14R, so that an absorbing horsepower of the main pumps 14L and 14R, expressed by a product of the discharge pressure and the discharge rate, does not exceed an output horsepower of the engine 11.

Moreover, the controller 30 may control the regulators 13L and 13R according to detection signals input from the negative control pressure sensors 19L and 19R and corresponding to the control pressures (hereinafter, referred to as "negative control pressures") generated by the negative control restrictors 18L and 18R, to control the discharge rates of the main pumps 14L and 14R. For example, the controller 30 decreases the discharge rates of the main pumps 14L and 14R as the negative control pressure increases, and increases the discharge rates of the main pumps 14L and 14R as the negative control pressure decreases. In this case, the controller 30 may control the regulators 13L and 13R to adjust the discharge rates of the main pumps 14L and 14R so as to become less than or equal to the preset maximum flow rates of the main pumps 14L and 14R, as described above.

In a standby state where none of the hydraulic actuators of the shovel 100 is operated (the state in FIG. 2A and FIG. 2B), the hydraulic oil discharged from the main pumps 14L and 14R passes through the center bypass oil passages C1L and C1R and reaches the negative control restrictors 18L and 18R. The flow of hydraulic oil discharged from the main pumps 14L and 14R increases the negative control pressures generated on the upstream sides of the negative control restrictors 18L and 18R. As a result, the controller 30 decreases the discharge rates of the main pumps 14L and 14R to a tolerable minimum discharge rate, to reduce a pressure loss (pumping loss) when the discharged hydraulic oil passes through the center bypass oil passages C1L and C1R.

On the other hand, when one of the hydraulic actuators is operated by the operating device 26, the hydraulic oil discharged from the main pumps 14L and 14R flows into the hydraulic actuator which is the target to be operated, through the control valve corresponding to the hydraulic actuator which is the target to be operated. The flow of the hydraulic oil discharged from the main pumps 14L and 14R causes an amount reaching the negative control restrictors 18L and 18R to decrease or disappear, to lower the negative control pressures generated on the upstream sides of the negative control restrictors 18L and 18R. As a result, the controller 30 can increase the discharge rates of the main pumps 14L and 14R, and circulate a sufficient amount of the hydraulic oil to the hydraulic actuator which is the target to be operated, to positively drive the hydraulic actuator which is the target to be operated.

Accordingly, in the standby state of the hydraulic driving system, the controller 30 can reduce wasteful energy consumption of the main pumps 14L and 14R, including pumping loss in the center bypass oil passages C1L and C1R generated by the hydraulic oil discharged from the main pumps 14L and 14R. In addition, when the hydraulic actuator operates, the controller 30 can supply the necessary and sufficient hydraulic oil from the main pumps 14L and 14R to the hydraulic actuator which is the target to be operated.

In addition, when the operating device 26 is the electric type, for example, the controller 30 may control the operating control valve as described above, to operate the hydraulic actuator according to the operation contents of the operating device 26.

Moreover, the controller 30 may perform the remote control of the shovel 100 using the operating control valve, for example. More particularly, the controller 30 may output a control command, corresponding to the contents of the remote control instructed by the remote control signal received from the external device, to the operating control valve. The operating control valve may use the hydraulic oil supplied from the pilot pump 15, and output a pilot pressure corresponding to the control command from the controller 30, so that the pilot pressure is applied to the pilot port of the corresponding control valve of the control valve 17. As a result, the contents of the remote control operation are reflected to the operation of the control valve 17, and the hydraulic actuators operate the various operating elements (driven elements) according to the contents of the remote control.

Further, the controller 30 may provides the automatic operation function of the shovel 100, for example, using the operating control valve. More particularly, the controller 30 may output a control command, corresponding to an operation command related to the automatic operation function, to the operating control valve. The operating command may be generated by the controller 30, or by another controller which performs a control related to the automatic operation function. The operating control valve may use the hydraulic oil supplied from the pilot pump 15, and output a pilot pressure corresponding to the control command from the controller 30, so that the pilot pressure is applied to the pilot port of the corresponding control valve of the control valve 17. Accordingly, the contents of the operation command related to the automatic operation function are reflected to the operation of the control valve 17, and the hydraulic actuators operate the various operating elements (driven elements) according to the automatic operation function.

In addition, the controller 30 (an example of the control device) may set the discharge rate (flow rate) of the main pump 14 at the time of performing the operation of the auxiliary attachment, according to the operation made by the user. In this case, the time of performing the operation of the auxiliary attachment, includes the time of performing an individual operation in which only the auxiliary attachment is operated, and the time of performing a combined operation in which the auxiliary attachment and another hydraulic actuator (for example, the boom cylinder 7 or the like) are operated simultaneously. The controller 30 includes a setting screen display processing unit 301, and a setting unit 302, as functional units implemented by executing one or more programs installed in the auxiliary storage device by the CPU. In addition, the controller 30 utilizes a setting storage unit 303. The setting storage unit 303 may be implemented by the auxiliary storage device of the controller 30, or an external storage device or the like communicable with the controller 30, for example.

Some of the functions of controller 30 may be implemented by other controllers. In other words, the functions of the controller 30 may be distributed among and performed by a plurality of controllers.

The regulators 13L and 13R adjust the discharge rates of the main pumps 14L and 14R, by adjusting the tilt angles of the swash plates of the main pumps 14L and 14R, respectively, under the control of the controller 30.

The negative control restrictors 18L and 18R are provided between the hydraulic oil tank, and the control valve 176L and the neutral and check valve 178 which are located most downstream of the center bypass oil passages C1L and C1R, respectively. Accordingly, the flow of hydraulic oil discharged from the main pumps 14L and 14R is restricted by the negative control restrictors 18L and 18R, and the negative control restrictors 18L and 18R generate the negative control pressures described above.

The negative control pressure sensors 19L and 19R detect the negative control pressures, and the detection signals corresponding to the detected negative control pressures are input to the controller 30.

The discharge pressure sensors 28L and 28R detect the discharge pressures of the main pumps 14L and 14R, respectively, and the detection signals corresponding to the detected discharge pressures are input to the controller 30.

The operation pressure sensor 29 detects the pilot pressure on the secondary side of the operating device 26, that is, the pilot pressure corresponding to the operating state (for example, the operating amount, the operating direction, or the like) of each of the driven elements (hydraulic actuators) of the operating device 26. The detection signals of the pilot pressures corresponding to the operating states of the undercarriage 1, the slewing upper structure 3, the boom 4, the arm 5, (the attitude of) the end attachment, the auxiliary attachment, or the like of the operating device 26, from the operation pressure sensor 29, are input to the controller 30.

When the operating device 26 is the electric type, the operation pressure sensor 29 may be omitted. This is because the controller 30 can ascertain the operating state of the operating device 26 from the contents of the operation signals output from the operating device 26.

The display device 50 is provided at a location (for example, a pillar portion or the like at the front right of the cabin 10), within the cabin 10 near the operator's seat, easily visible by the operator or the like, and displays various information screens under the control of the controller 30. The display device 50 may be a liquid crystal display or an organic Electro Luminescence (EL) display, for example, and may be a touchscreen panel which also serves as an operating unit.

The input device 52 is provided within a range manually accessible from the operator or the like in a seated position inside the cabin 10, and receives various operations from the operator or the like. The input device 52 may include an operation input device which receives operation inputs from the operator or the like, for example. The operation input device may include a touchscreen panel implemented in a display of the display device 50, a touch pad provided separately from the display of the display device 50, a knob switch provided at a tip of a lever portion of the lever device included in the operating device 26, and a button switch, a lever, a toggle, or the like provided in a periphery of the display device 50 or provided at a location relatively remote from the display device 50. The input device 52 may include a speech input device configured to receive a speech input from the operator or the like, for example. The speech input device may include a microphone, for example. Moreover, the input device 52 may include a gesture input device configured to receive a gesture input from the operator or the like, for example. The gesture input device may include an imaging device capable of capturing the state of the gesture made by the operator or the like inside the cabin 10, for example. A signal corresponding to input contents with respect to the input device 52 is input to the controller 30.

The setting screen display processing unit 301 displays, on the display device 50, an operation screen (hereinafter, referred to as an "auxiliary flow rate setting screen") for making a setting (hereinafter, referred to as an "auxiliary flow rate setting") related to the discharge rate of the main pump 14 at the time when the operator or the like operates the auxiliary attachment. The auxiliary flow rate setting screen will be described later in detail (refer to FIG. 3A through FIG. 3C, and FIG. 4A through FIG. 4C).

The setting storage unit 303 stores set contents of the auxiliary flow rate setting. Accordingly, the controller 30 reads out the set contents of the auxiliary flow rate setting from the setting storage unit 303, and refers to the read set contents so that the discharge rate of the main pump 14 at the time of operating the auxiliary attachment can be controlled according to the set contents.

[Details of Auxiliary Flow Rate Setting]

Figure 3A:
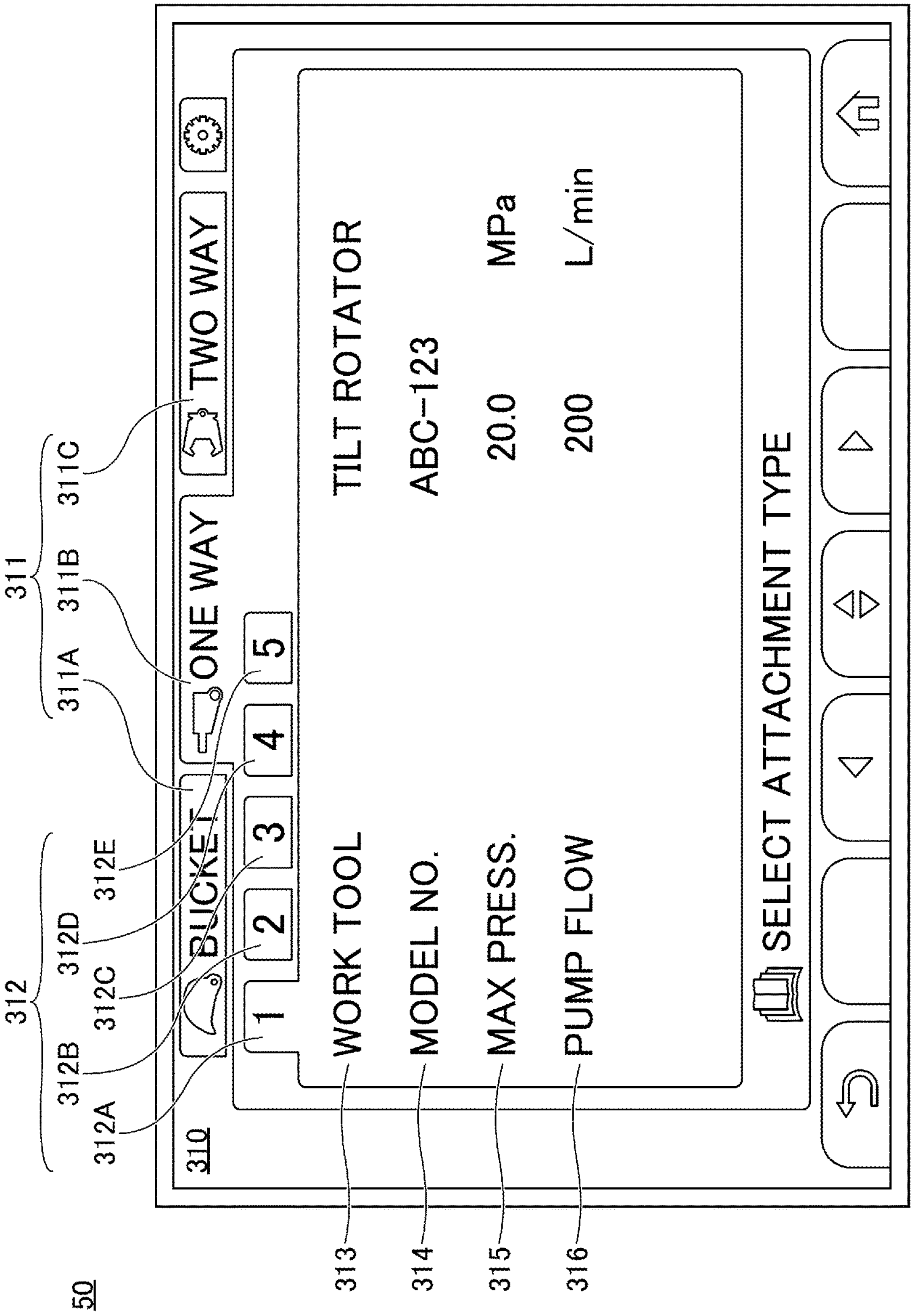
FIG. 3A is a diagram illustrating a first example of an auxiliary flow rate setting screen.
Figure 3B:
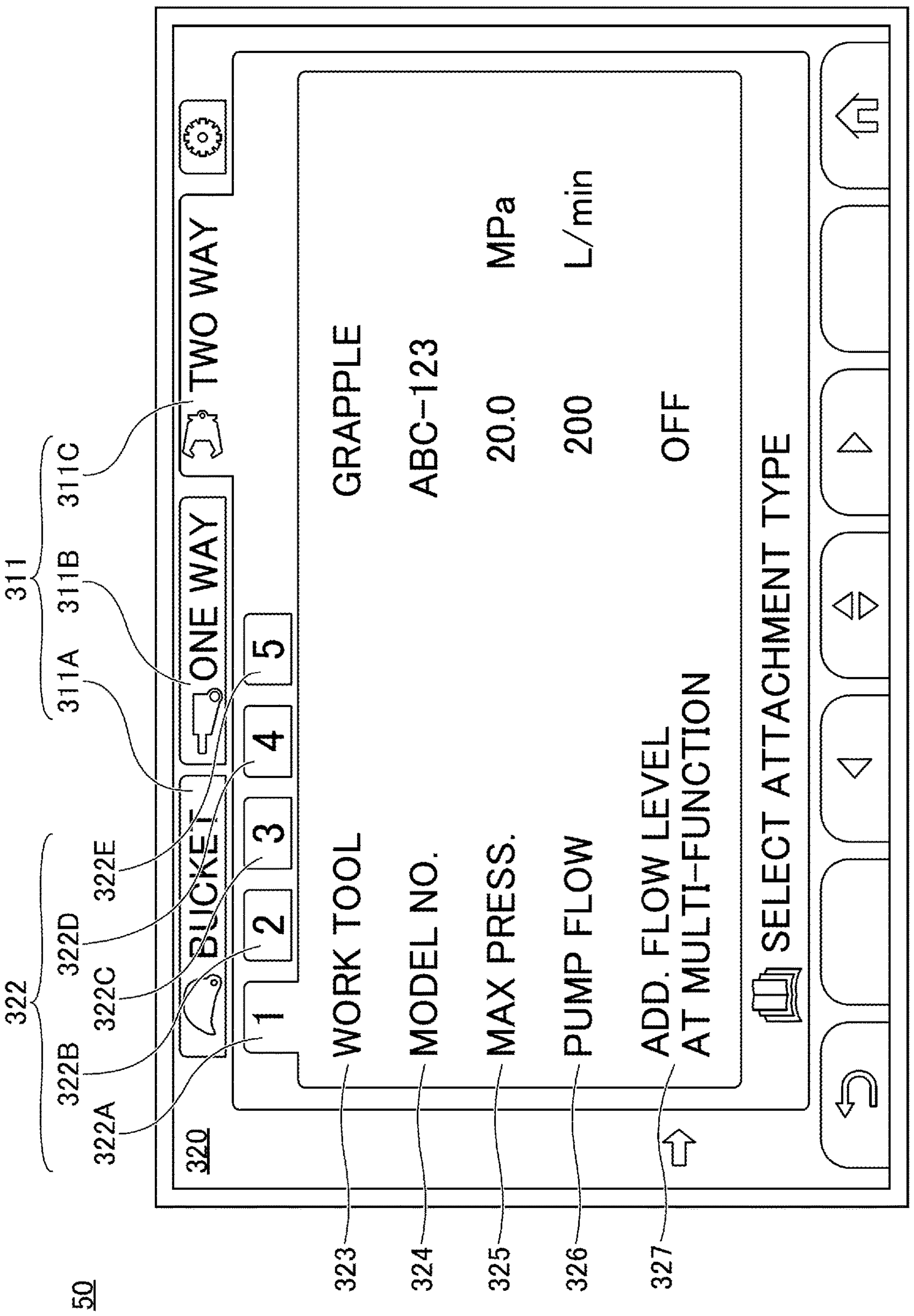
FIG. 3B is a diagram illustrating the first example of the auxiliary flow rate setting screen.
Figure 3C:
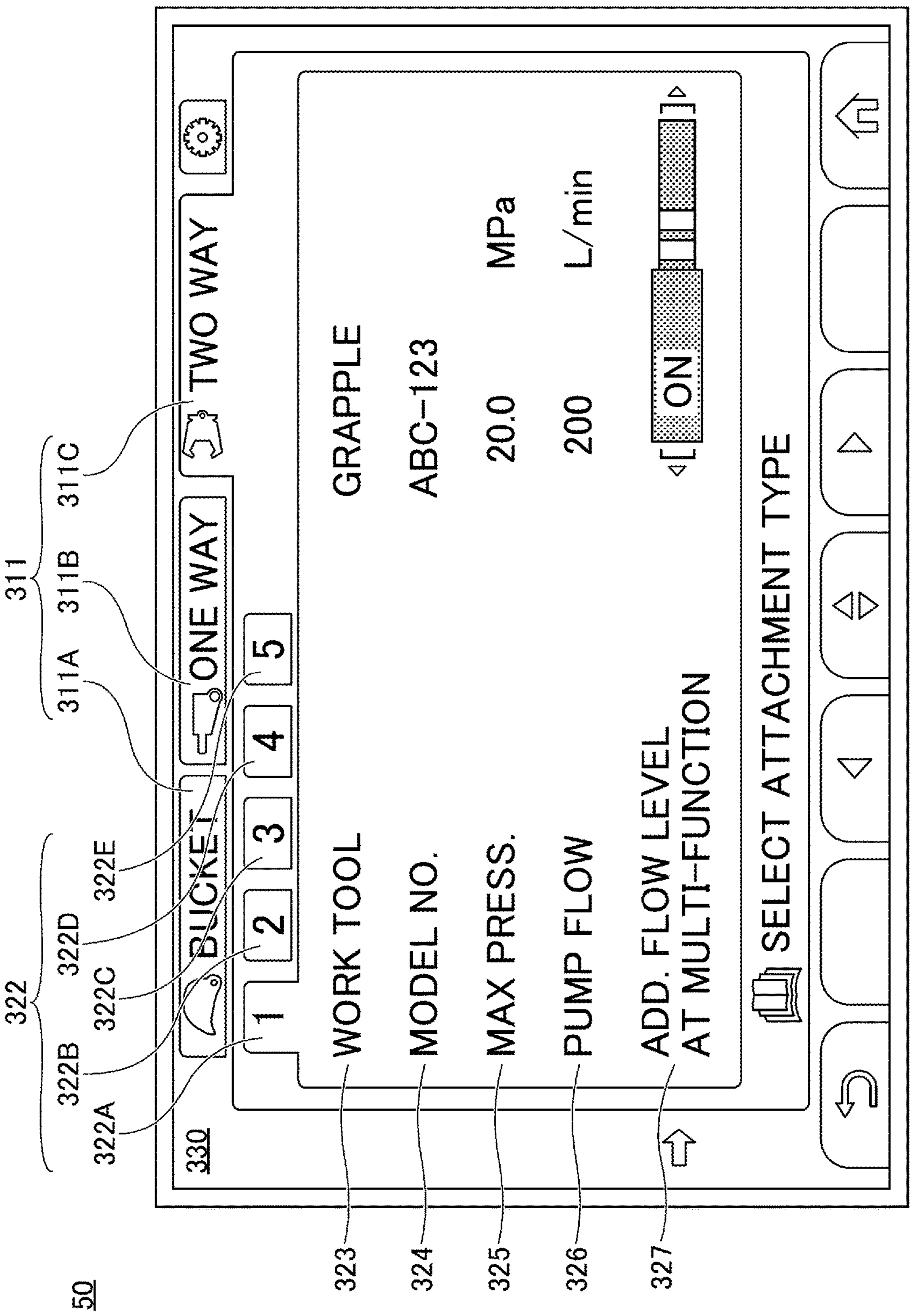
FIG. 3C is a diagram illustrating the first example of the auxiliary flow rate setting screen.
Figure 4A:
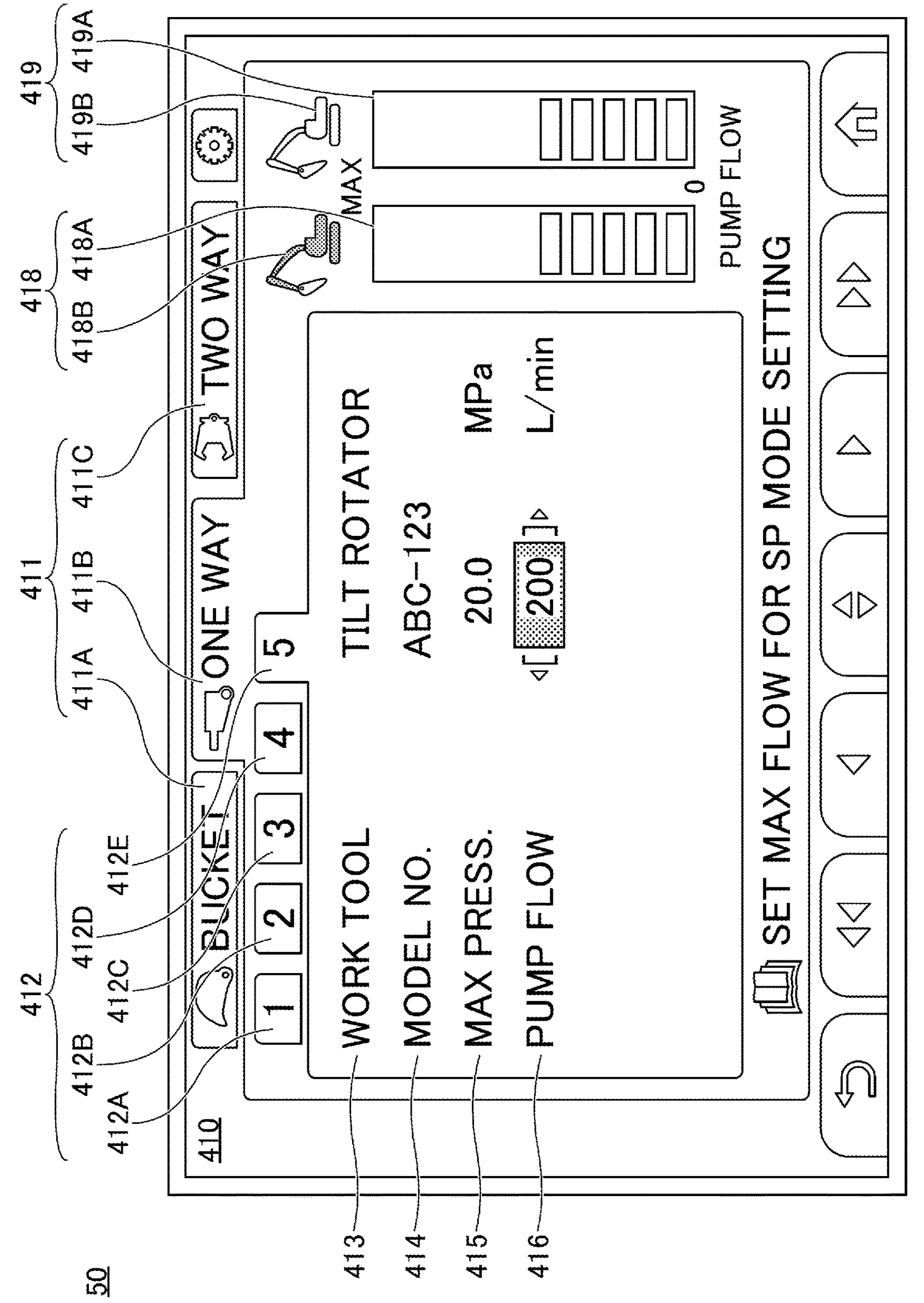
FIG. 4A is a diagram illustrating a second example of the auxiliary flow rate setting screen.
Figure 4B:
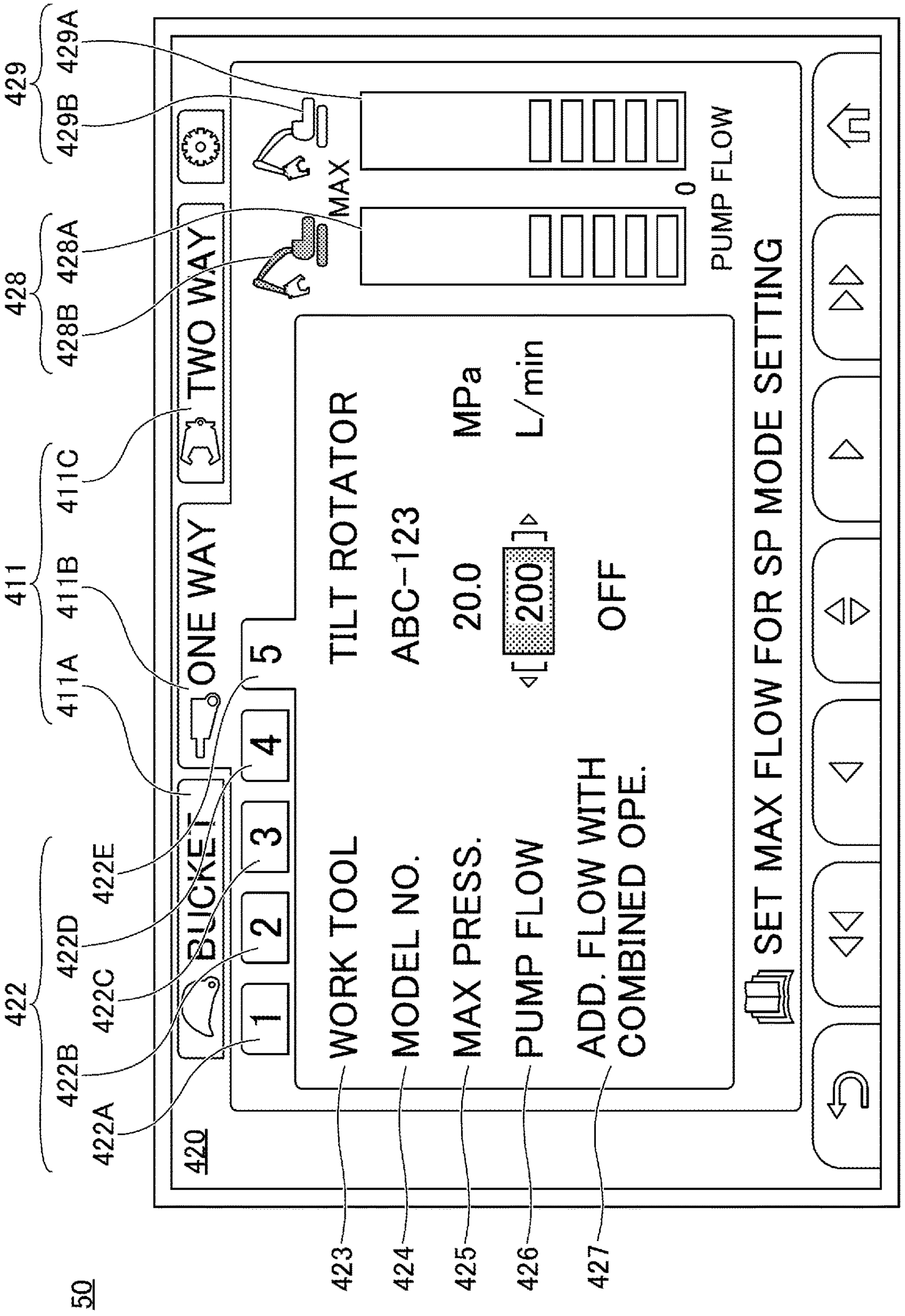
FIG. 4B is a diagram illustrating the second example of the auxiliary flow rate setting screen.
Figure 4C:
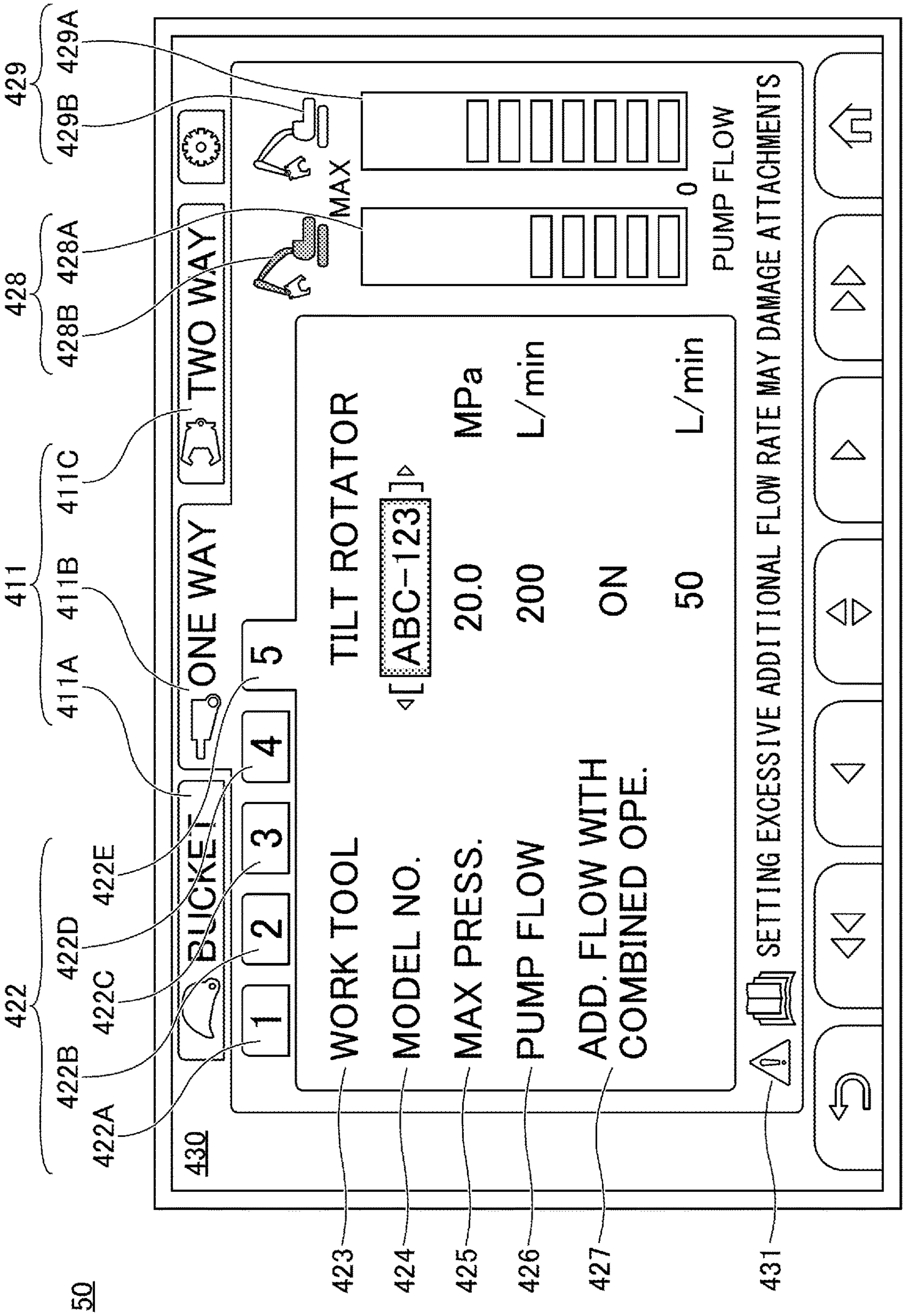
FIG. 4C is a diagram illustrating the second example of the auxiliary flow rate setting screen.

Specific examples of the auxiliary flow rate setting will be described, by referring to FIG. 3 (FIG. 3A through FIG. 3C) and FIG. 4 (FIG. 4A through FIG. 4C).

First Example of Auxiliary Flow Rate Setting

FIG. 3A through FIG. 3C are diagrams illustrating a first example of the auxiliary flow rate setting screens (auxiliary flow rate setting screens 310 through 330) displayed on the display device 50. More particularly, FIG. 3A is a diagram illustrating the auxiliary flow rate setting screen 310 for performing the auxiliary flow rate setting related to the single acting auxiliary attachment (for example, the breaker 90). FIG. 3B and FIG. 3C illustrate the auxiliary flow rate setting screens 320 and 330 for performing the auxiliary flow rate setting with respect to the double acting auxiliary attachment (for example, the crusher 92).

As illustrated in FIG. 3A through FIG. 3C, the auxiliary flow rate setting screens 310 through 330 include a tab 311 for switching a target (the bucket 6, the single acting auxiliary attachment, and the double acting auxiliary attachment) of the auxiliary flow rate setting.

The tab 311 includes tabs 311A through 311C.

The tab 311A is selected when setting the flow rate of the main pump 14 related to the bucket 6.

The tab 311B is selected when setting the auxiliary flow rate of the single acting auxiliary attachment.

The tab 311C is selected when setting the auxiliary flow rate of the double acting auxiliary attachment.

As illustrated in FIG. 3A, tab 311B is selected in the auxiliary flow rate setting screen 310.

The tab 311B includes a tab 312 for switching the type of single acting auxiliary attachment which is the target of the auxiliary flow rate setting. The tab 312 includes five tabs 312A through 312E for performing the auxiliary flow rate setting for each of the five types of single acting auxiliary attachments, and in this example, the tab 312A is selected. Hence, the user can perform different auxiliary flow rate settings for each of the plurality of types of single acting auxiliary attachments, on the auxiliary flow rate setting screen 310. The contents of the screen when each of the tabs 312A through 312E is selected are approximately the same, and thus, a description will be made on the tab 312A.

The tab 312A displays the set contents of the single acting auxiliary attachment. More particularly, the tab 312A displays items 313 through 316.

The item 313 displays the name of the single acting auxiliary attachment ("WORK TOOL"). In this example, a tilt rotator ("TILT ROTATOR") is set as the name of the auxiliary attachment. The user (hereinafter simply referred to as the "user"), such as the operator, a serviceman, or the like, may designate the item 313 via the input device 52, and arbitrarily set the name. For this reason, the user can identify a desired type of (single acting) auxiliary attachment from among a plurality of types of single acting auxiliary attachments which are set (registered) to the tabs 312A through 312E, by checking the name.

The item 314 displays a model ("MODEL NO.") of the single acting auxiliary attachment. In this example, "ABC-123" is set as the model. The user may designate the item 314 via input device 52, and arbitrarily set the model of the single acting auxiliary attachment. For this reason, the user can identify a desired type of (single acting) auxiliary attachment from among the plurality of types of single acting auxiliary attachments which are set (registered) to the tabs 312A through 312E, by checking the model.

The item 315 displays the set contents of the discharge pressure of the main pump 14, more particularly, a maximum discharge pressure ("MAX PRESS.") at the time of operating (more particularly, at the time of an individual operation and a combined operation of) the single acting auxiliary attachment. In this example, the discharge pressure is set to "20.0 MPa". The user can designate the item 315 via the input device 52, and set the maximum discharge pressure within a prescribed range at the time of operating the single acting auxiliary attachment, more particularly, at the time of the individual operation and the combined operation.

The item 316 displays the set contents related to the discharge flow rate ("PUMP FLOW") of the main pump 14 at the time of operating (more particularly, at the time of the individual operation and the combined operation of) the single acting auxiliary attachment. In this example, "200 L/min" (200 liters per minute) is set as the maximum flow rate of the main pump 14 at the time of operating the single acting auxiliary attachment. The user can designate the item 316 via the input device 52, and set the discharge rate (maximum flow rate) within a prescribed range (for example, a predefined range of the discharge rate which can be supplied solely by the main pump 14L) at the time of operating the single acting auxiliary attachment, more particularly, at the time of the individual operation and the combined operation.

As described above, in this example, the setting unit 302 performs the setting related to the discharge rate of the main pump 14 at the time of the individual operation and the combined operation of the single acting auxiliary attachment, according to the operation made by the user on the auxiliary flow rate setting screen 310 via the input device 52. For this reason, even at the time of the combined operation of the auxiliary attachment, the discharge rate (flow rate) of the main pump 14 can be appropriately adjusted according to the set contents. Thus, it is possible to prevent a situation where the flow rate of the auxiliary attachment becomes excessively high at the time of the combined operation of the auxiliary attachment and another hydraulic actuator, for example.

As illustrated in FIG. 3B and FIG. 3C, the tab 311C is selected in the auxiliary flow rate setting screens 320 and 330.

The tab 311C includes a tab 322 for switching the type of double acting auxiliary attachment which is the target of the auxiliary flow rate setting. The tab 322 includes five tabs 322A through 322E for performing the auxiliary flow rate setting for each of the five types of double acting auxiliary attachments, and in this example, the tab 322A is selected. Hence, the user can perform different auxiliary flow rate settings for each of the plurality of types of double acting auxiliary attachments, on the auxiliary flow rate setting screens 320 and 330. The contents of the screen when each of the tabs 322A through 322E is selected are approximately the same, and thus, a description will be made on the tab 322A.

The tab 322A displays the set contents of the double acting auxiliary attachment. More particularly, the tab 322A displays items 323 through 327.

The item 323 displays the name of the double acting auxiliary attachment ("WORK TOOL"). In this example, a grapple ("GRAPPLE") is set as the name of the auxiliary attachment. The user may designate the item 323 via the input device 52, and arbitrarily set the name. For this reason, the user can identify a desired type of auxiliary attachment from among a plurality of types of double acting auxiliary attachments which are set (registered) to the tabs 322A through 322E, by checking the name.

The item 324 displays a model ("MODEL NO.") of the double acting auxiliary attachment. In this example, "ABC-123" is set as the model. The user may designate the item 324 via input device 52, and arbitrarily set the model of the double acting auxiliary attachment. For this reason, the user can identify a desired type of (double acting) auxiliary attachment from among the plurality of types of double acting auxiliary attachments which are set (registered) to the tabs 322A through 322E, by checking the model.

The item 325 displays the set contents of the discharge pressure of the main pump 14, more particularly, a maximum discharge pressure ("MAX PRESS.") at the time of operating (more particularly, at the time of an individual operation and a combined operation of) the double acting auxiliary attachment. In this example, the discharge pressure is set to "20.0 MPa" (20 megapascals). The user can designate the item 325 via the input device 52, and set the maximum discharge pressure within a prescribed range at the time of operating the double acting auxiliary attachment, more particularly, at the time of the individual operation and the combined operation.

The item 326 displays the set contents related to the discharge flow rate ("PUMP FLOW") of the main pump 14 at the time of the individual operation of the double acting auxiliary attachment. In this example, "200 L/min" (200 liters per minute) is set as the maximum flow rate of the main pump 14 at the time of the individual operation of the double acting auxiliary attachment. The user can designate the item 326 via the input device 52, and set the discharge rate (maximum flow rate) within a prescribed range (for example, a predefined range of the discharge rate which can be supplied solely by the main pump 14L) at the time of the individual operation of the double acting auxiliary attachment.

The item 327 displays the set contents related to the discharge rate of the main pump 14 at the time of the combined operation of the double acting auxiliary attachment. More particularly, the item 327 displays the set contents related to an additional flow rate ("ADD.FLOW LEVEL AT MULTI-FUNCTION") at the time of the combined operation of the double action auxiliary attachment, with respect to the set contents (the discharge rate of the main pump 14 at the time of the individual operation) of the item 326.

For example, as illustrated in FIG. 3B, in the auxiliary flow rate setting screen 320, no additional flow rate ("OFF") is set with respect to the discharge rate of the main pump 14 at the time of the individual operation. In this case, the set contents related to the discharge rate of the main pump 14 at the time of the combined operation of the double action auxiliary attachment are the same as the set contents of the item 326. The user designates the item 327 and selects "OFF", via the input device 52. Accordingly, the set contents related to the discharge rate of the main pump 14 at the time of the combined operation of the double action auxiliary attachment can be the same as the set contents related to the discharge rate of the main pump 14 at the time of the individual operation.

On the other hand, as illustrated in FIG. 3C, for example, in the auxiliary flow rate setting screen 330, an additional flow rate ("ON") is set with respect to the discharge rate of the main pump 14 at the time of the individual operation, and the set contents of the additional flow rate are displayed as a bar graph having multiple levels. In this example, the bar graph amounting to two levels is displayed, of a maximum of five levels. In this state, a ratio of the flow rate allocated to each level may be different. For example, the flow rate allocated to a first level may be relatively low, and the flow rate allocated to other levels may become higher as the level becomes higher, or vice versa. The user designates the item 327, selects "ON", and sets the level of the bar graph corresponding to the additional flow rate, via the input device 52. Accordingly, it is possible to set the discharge rate of the main pump 14 at the time of the combined operation of the double action auxiliary attachment, higher than the discharge rate of the main pump 14 at the time of the individual operation.

Further, in the auxiliary flow rate setting screen 330, the set contents of the additional flow rate ("ON") with respect to the discharge rate of the main pump 14 at the time of the individual operation, are highlighted. For this reason, it easier to make the user recognize that the discharge rate of the main pump 14 at the time of the combined operation of the double acting auxiliary attachment is set higher than that at the time of the individual operation. Accordingly, the user can more easily recognize an erroneous operation, thereby preventing a situation where the additional flow rate is set due to the erroneous operation and the flow rate of the auxiliary attachment becomes excessively high.

As described above, in this example, the setting unit 302 sets the discharge rate of the main pump 14 at the time of the individual operation and the combined operation of the double acting auxiliary attachment, according to the input made by the user on the auxiliary flow rate setting screen 320 and 330 via the input device 52. In addition, the setting section 302 performs the setting related to the flow rate of the main pump 14, so that the flow rate of the main pump 14 at the time of the combined operation can be made higher than the flow rate of the main pump 14 at the time of the individual operation, according to the input made by the user on the auxiliary flow rate setting screens 320 and 330 via the input device 52. For this reason, even at the time of the combined operation of the auxiliary attachment, the discharge rate (flow rate) of the main pump 14 can be appropriately adjusted according to the set contents. Thus, it is possible to prevent a situation where the flow rate of the auxiliary attachment becomes excessively high at the time of the combined operation of the auxiliary attachment and another hydraulic actuator, for example. In addition, it is possible to prevent a situation where the flow rate of the double acting auxiliary attachment at the time of the combined operation becomes insufficient.

Second Example of Auxiliary Flow Rate Setting

FIG. 4A through FIG. 4C are diagrams illustrating a second example of the auxiliary flow rate setting screen (auxiliary flow rate setting screens 410 through 430) displayed on the display device 50. More particularly, FIG. 4A is a diagram illustrating the auxiliary flow rate setting screen 410 for performing the auxiliary flow rate setting related to the single acting auxiliary attachment (for example, the breaker 90). FIG. 4B and FIG. 4C illustrate the auxiliary flow rate setting screens 420 and 430 for performing the auxiliary flow rate setting related to the double acting auxiliary attachment (for example, the crusher 92), respectively.

As illustrated in FIG. 4A through FIG. 4C, the auxiliary flow rate setting screens 410 through 430 include a tab 411 for switching a target (the bucket 6, the single acting auxiliary attachment, and the double acting auxiliary attachment) of the auxiliary flow rate setting.

The tab 411 includes tabs 411A through 411C.

Because the tab 411 is the same as the tab 311 of FIG. 3A through FIG. 3C, and the tabs 411A through 411C are the same as the tabs 311A through 311C of FIG. 3A through FIG. 3C, a description thereof will be omitted.

As illustrated in FIG. 4A, tab 411B is selected in the auxiliary flow rate setting screen 410.

The tab 411B includes a tab 412 for switching the type of single acting auxiliary attachment which is the target of the auxiliary flow rate setting. The tab 412 includes five tabs 412A through 412E for performing the auxiliary flow rate setting for each of the five types of single acting auxiliary attachments, and in this example, the tab 412E is selected.

Because the tab 412 is the same as the tab 312 of FIG. 3A, and the tabs 412A through 412E are the same as the tabs 312A through 312E of FIG. 3A through FIG. 3C, a description thereof will be omitted.

The tab 412E displays the set contents of the single acting auxiliary attachment. More particularly, the tab 412E displays items 413 through 416, 418, and 419.

Because the items 413 through 416 are the same as the items 313 through 316 of FIG. 3A, a description thereof will be omitted.

The item 418 visually displays the set contents related to the discharge rate of the main pump 14 at the time of the individual operation of the single acting auxiliary attachment. The item 418 includes a gauge 418A, and a shovel image 418B.

The gauge 418A displays the set contents of the discharge rate (maximum flow rate) of the main pump 14 at the time of the individual operation of the single acting auxiliary attachment, that is, the set contents of the item 416, by a bar graph having multiple levels. In this example, a fifth level, of the maximum of ten levels, is set. In this state, the ratio of the flow rate allocated to each level may be different, similar to the above described case of FIG. 3C. Hereinafter, the same applies to gauges 419A, 428A, and 429A.

The shovel image 418B simulates the shovel 100. In the shovel image 418B, only a portion corresponding to the auxiliary attachment (more particularly, the breaker 90) is highlighted, to indicate the individual operation.

The item 419 visually displays the set contents related to the discharge rate of the main pump 14 at the time of the combined operation of the single acting auxiliary attachment. The item 419 includes a gauge 419A, and a shovel image 419B.

The gauge 419A displays the set contents of the discharge rate (maximum flow rate) of the main pump 14 at the time of the combined operation of the single acting auxiliary attachment, that is, the set contents of the item 416, by a bar graph having multiple levels. In this example, a fifth level, of the maximum of ten levels, is set.

The shovel image 419B simulates the shovel 100, similar to the shovel image 418B. In the shovel image 419B, only a portion corresponding to the auxiliary attachment (more particularly, the breaker 90) is highlighted, to indicate the combined operation.

As illustrated in FIG. 4B and FIG. 4C, the tab 411C is selected in the auxiliary flow rate setting screens 420 and 430.

The tab 411C includes a tab 422 for switching the type of double acting auxiliary attachment which is the target of the auxiliary flow rate setting. The tab 422 includes five tabs 422A through 422E for performing the auxiliary flow rate setting for each of the five types of double acting auxiliary attachments, and in this example, example, the tab 422E is selected.

Because the tab 422 is the same as the tab 322 of FIG. 3B and FIG. 3C, and the tabs 422A through 422E are the same as the tabs 322A through 322E of FIG. 3B and FIG. 3C, a description thereof will be omitted.

The tab 422E displays the set contents related to the double acting auxiliary attachment. More particularly, the tab 422E displays items 423 through 429.

Because the items 423 through 426 are the same as items 323 through 326 of FIG. 3B and FIG. 3C, a description thereof will be omitted.

The item 427 displays the set contents related to the discharge rate of the main pump 14 at the time of the combined operation of the double acting auxiliary attachment. More particularly, the item 427 displays the set contents related to the additional flow rate ("ADD.FLOW WITH COMBINED OPE.") at the time of the combined operation of the double action auxiliary attachment, with respect to the set contents (the discharge rate of the main pump 14 at the time of the individual operation) of the item 426.

For example, as illustrated in FIG. 4B, in the auxiliary flow rate setting screen 420, no additional flow rate ("OFF") is set with respect to the discharge rate of the main pump 14 at the time of the individual operation. In this case, the set contents related to the discharge rate of the main pump 14 at the time of the combined operation of the double action auxiliary attachment are the same as the set contents of the item 426. The user designates the item 427 and selects "OFF", via the input device 52. Accordingly, the set contents related to the discharge rate of the main pump 14 at the time of the combined operation of the double action auxiliary attachment can be the same as the set contents related to the discharge rate of the main pump 14 at the time of the individual operation.

On the other hand, as illustrated in FIG. 4C, for example, in the auxiliary flow rate setting screen 430, an additional flow rate ("ON") is set with respect to the discharge rate of the main pump 14 at the time of the individual operation, and the set contents of the additional flow rate are displayed by numerical values. In this example, "50 L/min" (50 liters per minute) is set. The user designates the item 327, selects "ON", and inputs the numerical value of the additional flow rate, via the input device 52. Accordingly, the discharge rate of the main pump 14 at the time of the combined operation of the double action type auxiliary attachment can be set higher than the discharge rate of the main pump 14 at the time of the individual operation.

The item 428 visually displays the set contents related to the discharge rate of the main pump 14 at the time of the individual operation of the single acting auxiliary attachment. The item 428 includes a gauge 428A, and a shovel image 428B.

The gauge 428A displays the set contents of the discharge rate (maximum flow rate) of the main pump 14 at the time of the individual operation of the single acting auxiliary attachment, that is, the set contents of the item 426, by a bar graph having multiple levels. In this example, a fifth level, of the maximum of ten levels, is set.

Because the shovel image 428B is the same as the shovel image 418B of FIG. 4A, a description thereof will be omitted.

The item 429 visually displays the set contents related to the discharge rate of the main pump 14 at the time of the combined operation of the double acting attachment. The item 429 includes a gauge 429A, and a shovel image 429B.

The gauge 429A displays the set contents of the discharge rate (maximum flow rate) of the main pump 14 at the time of the combined operation of the double acting auxiliary attachment, that is, the set contents of the item 427, by a bar graph having multiple levels.

For example, as illustrated in FIG. 4B, in the auxiliary flow rate setting screen 420, a fifth level, of the maximum of ten levels, that is, the same content as the gauge 428A corresponding to the individual operation, is set.

On the other hand, as illustrated in FIG. 4C, in the auxiliary flow rate setting screen 430, a seventh level, of the maximum of ten levels, which is two levels higher than that of the gauge 428A corresponding to the individual operation, is set.

Because the shovel image 429B is the same as the shovel image 419B of FIG. 4A, a description thereof will be omitted.

Further, as illustrated in FIG. 4C, the tab 422E of the auxiliary flow rate setting screen 430 includes an item 431.

The item 431 displays information related to an alert when the additional flow rate ("ON") is set in the item 427 with respect to the discharge rate of the main pump 14 at the time of the individual operation. In this example, "SETTING EXCESSIVE ADDITIONAL FLOW RATE MAY DAMAGE ATTACHMENTS" is displayed in the item 431. Hence, the controller 30, via the item 431, can reduce the possibility of the user, such as the operator or the like, setting an excessive additional flow rate. For this reason, it is possible to prevent a situation where the attachment is damaged by the setting of the excessive additional flow rate.

As described above, in this example, the display device 50, under the control of the setting screen display processing unit 301, displays the set contents of the flow rate of the main pump 14 at the time of the individual operation of the auxiliary attachment, and the set contents of the flow rate of the main pump 14 at the time of the combined operation of the auxiliary attachment, in a manner enabling comparison of the two. As a result, it is easy to ascertain the set contents.

[Overview of Shovel Support System]

Next, an overview of a shovel support system SYS including the shovel 100 will be described, with reference to FIG. 5.

Figure 5:
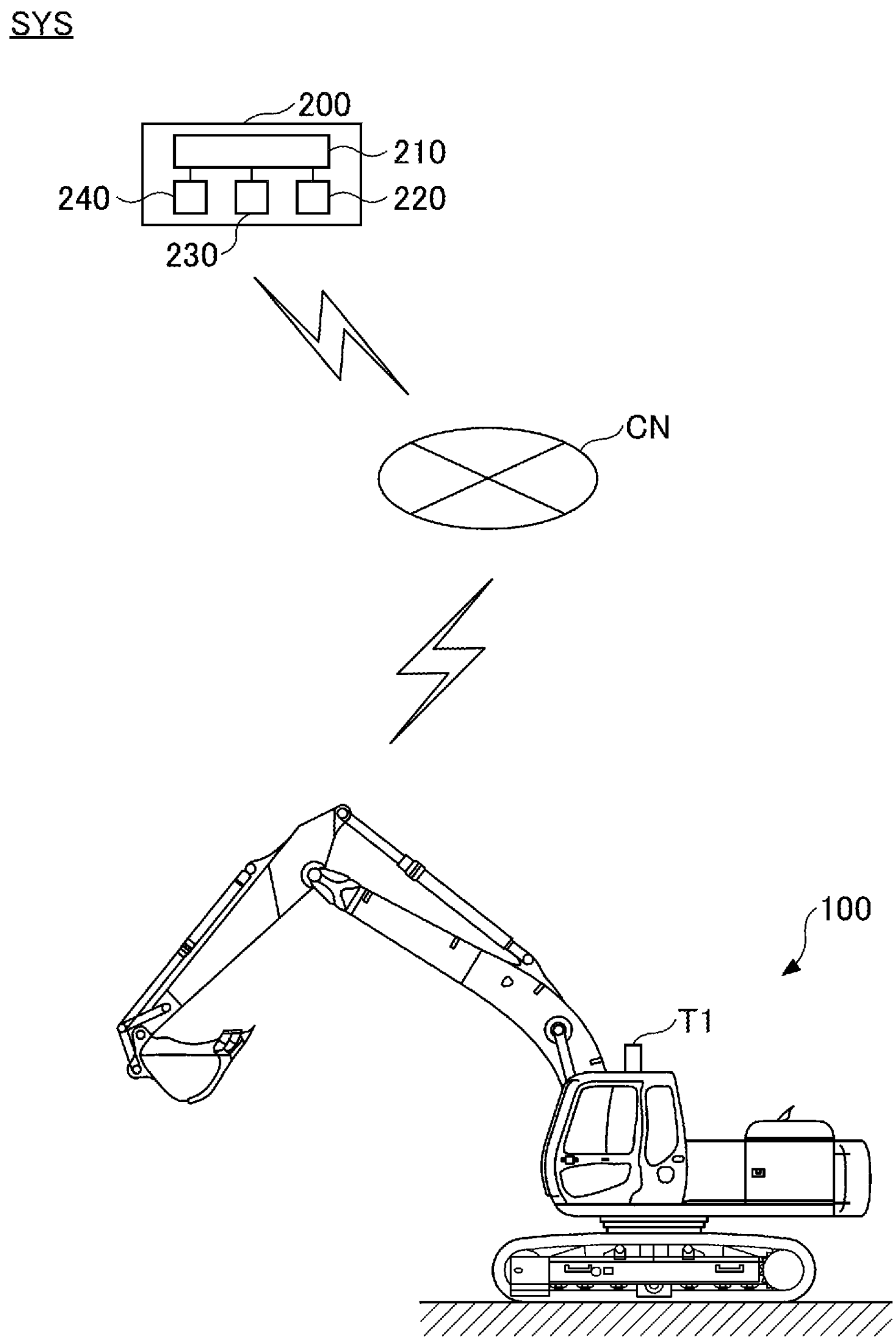
FIG. 5 is a diagram illustrating an example of a shovel support system.

FIG. 5 is a diagram illustrating an example of the shovel support system SYS including the shovel 100 according to this embodiment.

As illustrated in FIG. 5, the shovel support system SYS includes the shovel 100, and a support device 200.

The shovel 100 is communicably connected to the support device 200 through a communication network CN.

The support device 200 (an example of an information processing device) is communicably connected to the shovel 100 via the communication network CN, and supports the operation of the shovel 100. More particularly, the support device 200 may perform various settings related to the shovel 100, and perform a process to reflect the set contents to the shovel 100 via the communication network CN. The communication network CN may include a wide area network (WAN), for example. The wide area network may include a mobile communication network terminated by a base station, for example. In addition, the wide area network may also include a satellite communication network which uses a communication satellite, for example. Moreover, the wide area network may include the Internet network, for example. Further, the communication network CN may include a local area network (LAN), for example. The local area network may be a cable or a wireless network. The local area network may include a short range wireless communication network, such as WiFi, Bluetooth (registered trademark), or the like, for example.

The support device 200 may be a management device (cloud server) of a management (or support) center located outside a work site of the shovel 100, for example. In addition, the support device 200 may be an edge server located in a temporary office within the work site of the shovel 100 or at a location (for example, a station building or a base station) relatively close to the work site of the shovel 100, for example. Moreover, the support device 200 may be a fixed terminal device (for example, a desktop computer terminal, or the like) provided in the temporary office or the like at the work site of the shovel 100, for example. Further, the support device 200 may be a portable terminal (for example, a smartphone, a tablet terminal, a laptop computer terminal, or the like) carried by the operator, or a supervisor, a worker, or the like at the work site of the shovel 100, for example.

[Configuration of Shovel Support System]

Next, a configuration of the shovel support system SYS will be described, with reference to FIG. 5.

As illustrated in FIG. 5, the shovel 100 includes a communication device T1.

The communication device T1 communicates with the support device 200 or the like via the communication network CN. Accordingly, the shovel 100 can receive various signals from the support device 200.

The configuration of the shovel 100 may be the same as that of FIG. 2A and FIG. 2B described above, except that the communication device T1 is additionally provided.

As illustrated in FIG. 5, the support device 200 includes a controller 210, a communication device 220, a display device 230, and an input device 240.

The controller 210 (an example of a setting unit) performs control related to the support device 200. Functions of the controller 210 may be implemented by arbitrary hardware, a combination of hardware and software, or the like. For example, the controller 30 may be formed mainly of a computer including a CPU, a memory device such as a RAM or the like, an auxiliary storage device such as a ROM or the like, and various input and output interfaces for interfacing with the outside.

The communication device 220 (an example of a communication unit) communicates with the shovel 100 or the like via the communication network CN. The communication device 220 may communicate directly with the shovel 100 via the communication network CN, or communicate with a predetermined relay device and communicate with the shovel 100 via the communication network CN and the relay device. When the support device 200 is the fixed terminal device, the portable terminal device, or the like, the relay device may be a server device (management device) which manages the shovel 100.

The display device 230 displays an information image for the user of the support device 200, under a control of the controller 210.

The input device 240 receives various inputs from a user of the support device 200, and signals corresponding to the input contents are input to the controller 210. The input device 240 includes an operation input device which receives an operation input from the user, for example. The operation input device includes a touchscreen panel attached to the display device 230, and a touch pad, a keyboard, a mouse, or the like provided separately from the display device 230, for example. In addition, the input device 240 may include a speech input device configured to receive a speech input from the user, and a gesture input device configured to receive a gesture input from the user, for example.

[Auxiliary Flow Rate Setting By Shovel Support System]

Next, an auxiliary flow rate setting by the shovel support system SYS will be described, with reference to FIG. 5.

In the shovel support system SYS, the auxiliary flow rate setting may be enabled from the support device 200 communicably connected to the shovel 100.

The display 230 provided in the support device 200 may display an auxiliary flow rate setting screen similar to those of FIG. 3A through FIG. 3C and FIG. 4A through FIG. 4C, under the control of the controller 210. The controller 210 (an example of the setting unit) of the support device 200 may perform the auxiliary flow rate setting according to the input contents of the input made by the user from the auxiliary flow rate setting screen via the input device 240. The controller 210 may transmit a signal (hereinafter referred to as an "auxiliary flow rate setting request signal"), requesting the auxiliary flow rate setting including the input contents (set contents), to the shovel 100 via the communication device 220 (an example of the communication unit). Accordingly, the shovel 100 (the setting unit 302) can perform the auxiliary flow rate setting according to the auxiliary flow rate setting request signal received from the support device 200 by the communication device T1. Hence, the user, such as the operator of the shovel 100, the supervisor at the work site, an administrator at the management (or support) center, or the like, may control the shovel 100 to perform the auxiliary flow rate setting from the outside of the shovel 100. For this reason, it is possible to improve convenience to the user.

Variations and Modifications

Although the embodiments are described above in detail, the present disclosure is not limited to the specific embodiments, and various variations and modifications may be made within the scope of the appended claims.

For example, in the embodiments described above, the controller 30 performs the setting related to the discharge rate of the main pump 14 at the time of operating the auxiliary attachment, but may perform the setting related to an arbitrary discharge rate (flow rate characteristic) of the main pump 14 in a similar manner. The controller 30 may perform the setting related to an upper limit horsepower of a gross horsepower control, the setting related to the maximum flow rate of a specific operation, or the like, according to a predetermined input made by the operator via the input device 52, for example Similarly, the support device 200 (controller 210) may perform the setting related to the arbitrary discharge rate (flow rate characteristic) of the main pump 14 according to the predetermined input received by the input device 240, and transmit signals including the set contents to the shovel 100 via the communication device 220.

Moreover, in the examples of the embodiments, the variations, and the modifications described above, the controller 30 performs the setting related to the discharge rate of the main pump 14, but may perform the setting (adjustment) of an arbitrary parameter related to the operation of the main pump 14 in a similar manner. Similarly, the support device 200 (controller 210) may perform the setting of the arbitrary parameter related to the operation of the main pump 14 according to the predetermined input received by the input device 240, and transmit signals including the set contents to the shovel 100 via the communication device 220.

Further, in the examples of the embodiments, the variations, and the modifications described above, the controller 30 performs the setting of the parameter related to the operation of the main pump 14, but may perform the setting (adjustment) of the parameter related to the devices of the shovel 100 other than the main pump 14. The controller 30 may perform the setting (adjustment) of the parameter (for example, an operating speed, an operating acceleration, or the like) related to the operation of the driven element (that is, a corresponding actuator), for example. In addition, the controller 30 may perform the setting (adjustment) of a control parameter related to a motor or the engine 11 which drives the main pump 14, a control parameter related to a power supply which supplies power to the motor, or the like. Similarly, the support device 200 (controller 210) may perform the setting (adjustment) of the parameter related to the device of the shovel 100 other than the main pump 14, according to the predetermined input received by the input device 240, and transmit signals including the set contents to the shovel 100 via the communication device 220.

In the examples of the embodiments, the variations, and the modifications described above, the shovel 100 is configured to hydraulically drive the various driven elements such as the undercarriage 1, the slewing upper structure 3, the boom 4, the arm 5, the bucket 6, or the like, however, some of the driven elements of the shovel 100 may be electrically driven. In other words, the configuration or the like disclosed in the above described embodiments may be applied to a hybrid shovel, an electric shovel, or the like.

According to the embodiments and the modifications described above, it is possible to provide a technique capable of appropriately adjusting the flow rate of the hydraulic pump at the time of performing the combined operation in which the auxiliary attachment and another driven element are operated simultaneously.

It should be understood that the invention is not limited to the above described embodiments, but may be modified into various forms on the basis of the spirit of the invention. Additionally, the modifications are included in the scope of the invention.

What is claimed is:

1. A shovel comprising:

an undercarriage;

an upper slewing structure which is rotatably mounted on the undercarriage;

a boom attached to the upper slewing structure;

an arm attached to a tip end of the boom;

an auxiliary attachment attached to a tip end of the arm;

a hydraulic pump configured to supply a hydraulic oil to the auxiliary attachment and other hydraulic actuators;

an input device configured to receive an input from a user;

a controller; and a display device configured to display set contents related to a flow rate of the hydraulic pump set by the controller, wherein the controller performs a setting related to the flow rate of the hydraulic pump at a time of an individual operation and the flow rate of the hydraulic pump at a time of a combined operation in which the auxiliary attachment and the other hydraulic actuators are operated simultaneously, on a single setting screen of the display device, respectively, the setting related to the flow rate of the hydraulic pump at the time of the combined operation is performed according to a predetermined input received by the input device, the display device displays the set contents of the flow rate of the hydraulic pump at the time of the individual operation by a first bar graph having multiple levels and the set contents of the flow rate of the hydraulic pump at the time of the combined operation by a second bar graph having multiple levels, such that the first bar graph and the second bar graph are displayed in mutually adjacent display areas enabling a comparison of the two flow rates, and the controller sets information indicating a presence of an additional flow rate of the hydraulic pump at the time of the combined operation, with respect to the flow rate of the hydraulic pump at the time of the individual operation, and displays an alert on the display device when the set information indicates the presence of the additional flow rate to indicate that setting an excessive additional flow rate may damage the auxiliary attachment.

2. The shovel as claimed in claim 1, wherein the controller performs the setting related to the flow rate of the hydraulic pump, so that the flow rate of the hydraulic pump at the time of the combined operation becomes higher than the flow rate of the hydraulic pump at the time of the individual operation.

3. The shovel as claimed in claim 2, wherein the controller performs the setting related to the flow rate of the hydraulic pump, so that the flow rate of the hydraulic pump at the time of the combined operation becomes higher than the flow rate of the hydraulic pump at the time of the individual operation when the auxiliary attachment is a double acting type, and performs the setting related to the flow rate of the hydraulic pump, so that the flow rate of the hydraulic pump at the time of the combined operation does not become higher than the flow rate of the hydraulic pump at the time of the individual operation when the auxiliary attachment is a single acting type.

4. The shovel as claimed in claim 2, wherein the display device highlights the set contents which are displayed, when the flow rate of the hydraulic pump at the time of the combined operation is set higher than the flow rate of the hydraulic pump at the time of the individual operation.

5. The shovel as claimed in claim 4, wherein the display device displays the set contents of the flow rate of the hydraulic pump at the time of the combined operation as the additional flow rate with respect to the flow rate of the hydraulic pump at the time of the individual operation.

6. The shovel as claimed in claim 5, wherein the display device displays the additional flow rate by the second bar graph having the multiple levels, and a ratio of the flow rate allocated to each level of the second bar graph is different.

7. The shovel as claimed in claim 2, wherein the controller performs the setting related to the flow rate of the hydraulic pump at the time of the combined operation, for each type of the auxiliary attachment.

8. The shovel as claimed in claim 1, wherein the controller performs the setting related to the flow rate of the hydraulic pump at the time of the combined operation, for each type of the auxiliary attachment.

9. The shovel as claimed in claim 1, wherein the display device simultaneously displays the first bar graph and the second bar graph in the mutually adjacent display areas.

10. An information processing apparatus comprising:

a communication unit configured to communicate with a shovel including a undercarriage, an upper slewing structure which is rotatably mounted on the undercarriage, a boom attached to the upper slewing structure, an arm attached to a tip end of the boom, an auxiliary attachment attached to a tip end of the arm, and a hydraulic pump configured to supply a hydraulic oil to the auxiliary attachment and other hydraulic actuators;

an input device configured to receive an input from a user;

a display device configured to display set contents related to a flow rate of the hydraulic pump; and a controller configured to perform a setting related to the flow rate of the hydraulic pump at a time of an individual operation and the flow rate of the hydraulic pump at a time of a combined operation in which the auxiliary attachment and the other hydraulic actuators are operated simultaneously, on a single setting screen of the display device, respectively, wherein the setting related to the flow rate of the hydraulic pump at the time of the combined operation is performed according to a predetermined input received by the input device, the communication unit transmits contents set by the controller to the shovel, the display device displays the set contents of the flow rate of the hydraulic pump at the time of the individual operation by a first bar graph having multiple levels and the set contents of the flow rate of the hydraulic pump at the time of the combined operation by a second bar graph having multiple levels, such that the first bar graph and the second bar graph are displayed in mutually adjacent display areas enabling a comparison of the two flow rates, and the controller sets information indicating a presence of an additional flow rate of the hydraulic pump at the time of the combined operation, with respect to the flow rate of the hydraulic pump at the time of the individual operation, and displays an alert on the display device when the set information indicates the presence of the additional flow rate to indicate that setting an excessive additional flow rate may damage the auxiliary attachment.

11. The information processing apparatus as claimed in claim 10, wherein the display device highlights the set contents which are displayed, when the flow rate of the hydraulic pump at the time of the combined operation is set higher than the flow rate of the hydraulic pump at the time of the individual operation.

12. The information processing apparatus as claimed in claim 11, wherein the display device displays the additional flow rate by the second bar graph having the multiple levels, and a ratio of the flow rate allocated to each level of the second bar graph is different.

13. The information processing apparatus as claimed in claim 10, wherein the display device simultaneously displays the first bar graph and the second bar graph in the mutually adjacent display areas.

* * * * *